(12) United States Patent
Coote et al.

(10) Patent No.: US 11,596,849 B2
(45) Date of Patent: Mar. 7, 2023

(54) END ASSEMBLY FOR A DANCE EXERCISE POLE

(71) Applicant: X-POLE ASIA LIMITED, Hong Kong (CN)

(72) Inventors: Clive Maxwell Coote, Hong Kong (CN); Yanwei Yuan, Hong Kong (CN)

(73) Assignee: X-POLE ASIA LIMITED, Kowloon (CN)

( * ) Notice: Subject to any disclaimer, the term of this patent is extended or adjusted under 35 U.S.C. 154(b) by 607 days.

(21) Appl. No.: 16/587,240

(22) Filed: Sep. 30, 2019

(65) Prior Publication Data

US 2020/0023261 A1   Jan. 23, 2020

Related U.S. Application Data

(63) Continuation of application No. PCT/CN2017/079287, filed on Apr. 1, 2017.

(51) Int. Cl.
*A63B 71/02* (2006.01)
*A63B 9/00* (2006.01)
(Continued)

(52) U.S. Cl.
CPC .............. *A63B 71/028* (2013.01); *A63B 9/00* (2013.01); *A63B 21/00047* (2013.01); *F16B 2/10* (2013.01); *A63B 2244/225* (2013.01)

(58) Field of Classification Search
CPC ... A63B 2244/225; A63B 9/00; A63B 71/028; A63B 72/023; A63B 21/00047;
(Continued)

(56) References Cited

U.S. PATENT DOCUMENTS 4,076,437 A * 2/1978 Mazzolla ............... F16B 7/1427
 403/109.5
4,632,597 A * 12/1986 Clausen ............... F16M 11/046
 248/412

(Continued)

FOREIGN PATENT DOCUMENTS

AU 2005100800 A4 10/2005
CN 1196110 A 10/1998
(Continued)

OTHER PUBLICATIONS

Chinese Office Action and Search report dated Oct. 26, 2020 for Chinese Application No. 201780089302.2.
(Continued)

*Primary Examiner* — Jennifer Robertson
(74) *Attorney, Agent, or Firm* — EIP US LLP

(57) ABSTRACT

An end assembly for a dance exercise pole. The end assembly comprises: an end part; and a connector configured for connection to a dance pole. A first engagement element is connected to the connector; and there is a second engagement element engageable with the first engagement element. A movable element is movable between a first position and a second position to move at least one of the first engagement element or the second engagement element and thereby switch the end part respectively between: a first configuration with the first engagement element disengaged from the second engagement element, with the connector capable of rotation relative to the end part; and a second configuration with the first engagement element engaged with the second engagement element to restrict the rotation relative to the end part.

24 Claims, 41 Drawing Sheets

(51) Int. Cl.
*A63B 21/00* (2006.01)
*F16B 2/10* (2006.01)

(58) Field of Classification Search
CPC .......... F16M 11/2014; F16M 2200/024; F16B 7/0406; F16B 7/0426; Y10T 403/7005; Y10T 403/7009; Y10T 403/7045; F16N 2/10; F16N 2/12
See application file for complete search history.

(56) References Cited

U.S. PATENT DOCUMENTS

| | | | |
|---|---|---|---|
| 5,460,353 A * | 10/1995 | Rittenhouse | E01F 9/692 256/64 |
| 6,699,158 B1 | 3/2004 | Richardson et al. | |
| 7,338,411 B2 | 3/2008 | Blacker | |
| 8,137,243 B2 * | 3/2012 | Coote | A63B 9/00 482/33 |
| 2006/0171776 A1* | 8/2006 | Luft | F16B 21/04 403/267 |
| 2010/0197464 A1 | 8/2010 | Coote | |
| 2013/0005538 A1 | 1/2013 | Coote | |

FOREIGN PATENT DOCUMENTS

| | | |
|---|---|---|
| CN | 2558804 Y | 7/2003 |
| CN | 102083701 A | 6/2011 |
| CN | 202315144 U | 7/2012 |
| CN | 203355223 U | 12/2013 |
| CN | 203483798 U | 3/2014 |
| CN | 205516263 U | 8/2016 |
| JP | 2015531614 A | 11/2015 |
| TW | 201036681 A | 10/2010 |
| WO | 2005049967 A1 | 6/2005 |
| WO | 2014013301 A1 | 1/2014 |

OTHER PUBLICATIONS

International Search Report and Written Opinion dated Jan. 10, 2018 for PCT Application No. PCT/CN2017/079287.
Supplementary International Search Report and Written Opinion dated Jul. 3, 2019 for PCT Application No. PCT/CN2017/079287.
Taiwan Office Action and Search report dated Oct. 12, 2021 for Taiwan Application No. 107111177.
https://www.facebook.com/plesni.studio.mademoiselle, Nov. 3, 2016.

* cited by examiner

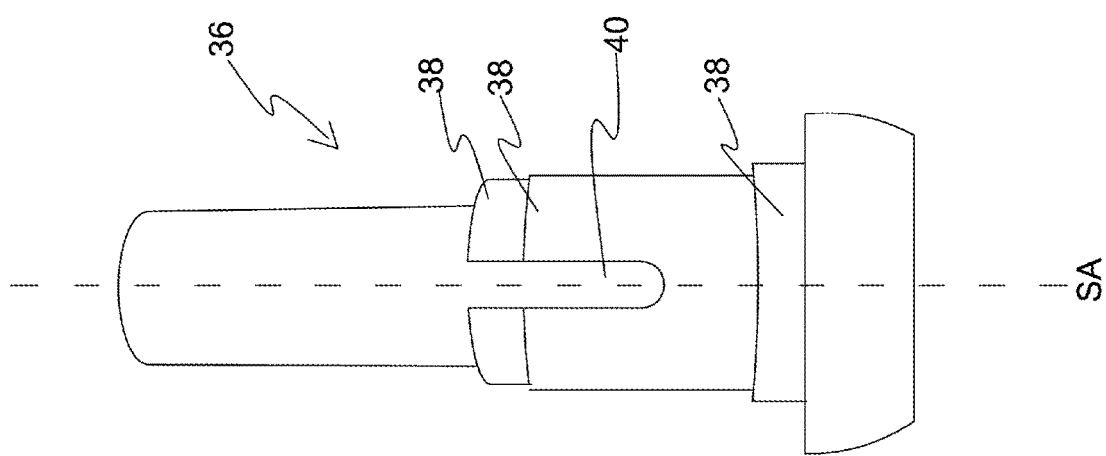

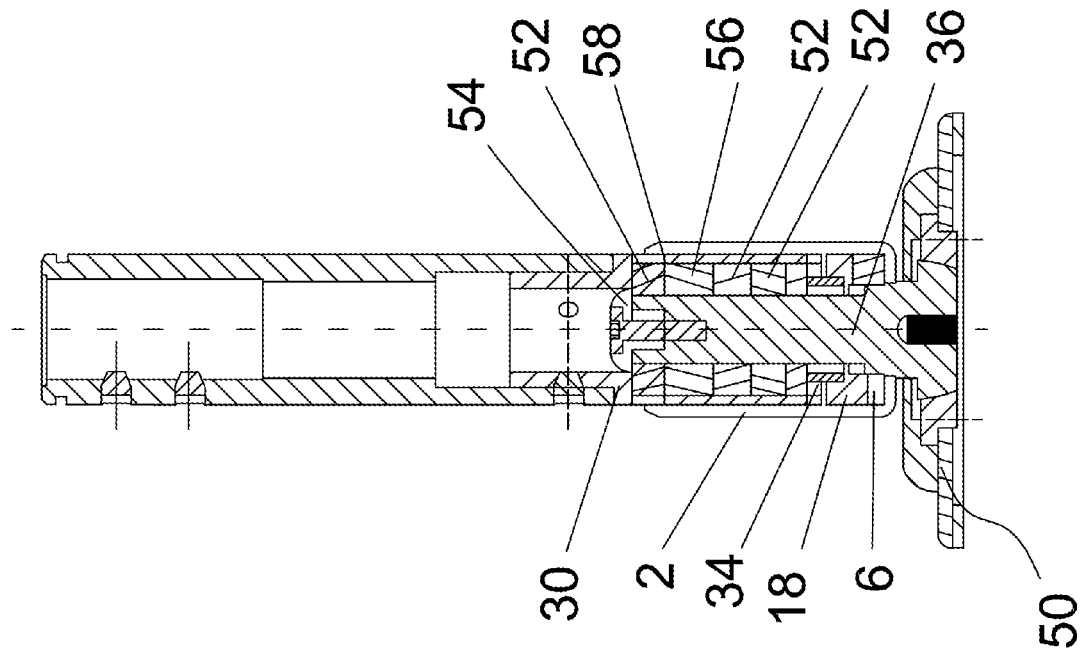
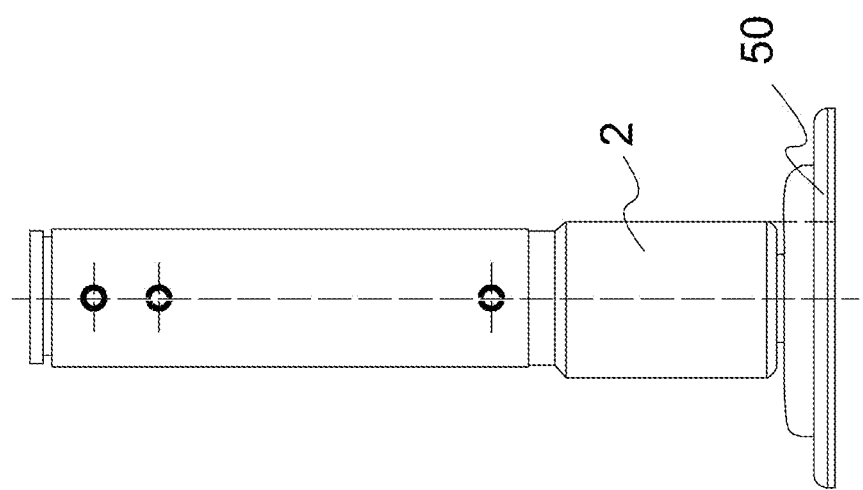
Figure 9b
Figure 9a

SECTION A-A

END ASSEMBLY FOR A DANCE EXERCISE POLE

CROSS-REFERENCE TO RELATED APPLICATIONS

This application is a continuation of International Application No. PCT/CN2017/079287, filed Apr. 1, 2017, under 35 U.S.C. § 119(a). The above-referenced patent application is incorporated by reference in its entirety.

BACKGROUND OF THE INVENTION

Field of the Invention

Dance exercise poles are used in the sport of pole dancing. A popular example is mounted between a floor and a ceiling, and allows a robust fixing so that the pole will hold a dancer's weight when supported by the pole.

Some dance exercise pole models are switchable between a so-called static mode with the dance exercise pole non-rotatable relative to a base, and a so-called spinning mode in which the dance exercise pole is rotatable relative to the base, about a longitudinal axis of the dance exercise pole.

In known dance exercise poles, to switch from the spinning mode to the static mode, a tool such as an Allen or hex key is used to screw at least one screw inwards to engage with a flat surface on the pole. This restricts the rotation of the dance exercise pole relative to the base.

Such a mechanism is however slow for switching between the static and spinning modes, and requires a separate tool which may be lost.

It is desirable to improve a mechanism for switching a dance exercise pole between a static and spinning mode.

BRIEF DESCRIPTION OF THE DRAWINGS

FIG. 5 shows a shaft according to examples;

FIGS. 5a to 6b show an end assembly partially assembled in different configurations, according to examples;

FIGS. 9a and 9b show in side and cross-section an end assembly according to examples;

DETAILED DESCRIPTION OF CERTAIN INVENTIVE EMBODIMENTS

Figure 1B:
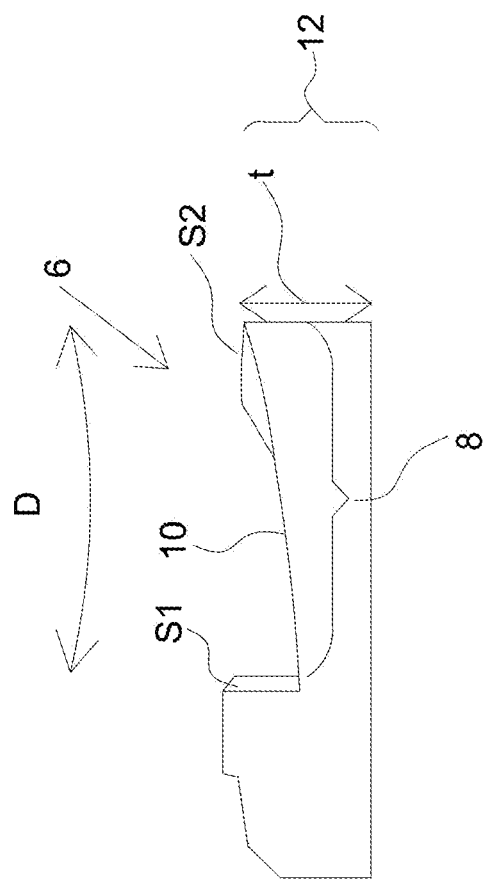
FIGS. 1a to 1f show various views of a movable element and a handle of examples.

Examples are described herein of an end assembly for a dance exercise pole. The end assembly may be fitted at an end of a dance exercise pole, for example at a base end on a floor or other surface on which the dance exercise pole is to extend upwards from. In other examples the end assembly may be fixed as a base assembly to a plate or frame as part of a stage or platform, for example so the dance exercise pole extends upwards in a freestanding manner without an upper end of the pole connected to a ceiling or equivalent. In other examples, the end assembly may be installed at an upper or top end of a dance exercise pole, for example to a ceiling or joist or other surface from which the dance exercise pole is to extend downwards from.

Examples are described below in the context of the end assembly being a base assembly, with for example an end part such as a base (such as a base plate) but it is to be appreciated that the features and functions can be applied appropriately to an end assembly for installing at an upper or top end of the dance exercise pole, for example with an end part such as a top plate instead of a base plate.

The end assembly has a base and a connector for connection to a part of a dance exercise pole, otherwise referred to as a dance pole. The connector may be directly connected to an end of a dance pole or a portion of a dance pole, or in other examples may be indirectly connected via a joint or a connecting tube, for example, as the skilled person will appreciate. In some examples the connector may be formed as part of the dance exercise pole itself.

The end assembly has at least a first engagement element connected to the connector and a second engagement element engageable with the first engagement element. Typically one such engagement element is any surface or part which is shaped to engage with the other such engagement element, and hence the shape of one such engagement element is for example complementary to the shape of the other such engagement element, so that when engaged they interlock or interdigitate with each other, for example.

There is a movable element movable between a first position and a second position to move at least one of the first engagement element and the second engagement element and thereby switch the end assembly between respectively a first configuration and a second configuration. For example, with the movable element in the first position, the first engagement element is disengaged from the second engagement element, and with the movable element in the second position, the first engagement element is engaged with the second engagement element. In the first configuration, the connector is capable of rotation relative to the base; such a configuration may be considered a so-called spinning mode. In the second configuration, the rotation of the connector relative to the base is restricted, for example to substantially lock the connector against the rotation relative to the base; such a configuration may be considered a so-called static mode. Substantially lock covers examples where there may be some tolerable rotational movement of the connector relative to the base which does not affect the required performance of the end assembly to provide a static mode. This may otherwise be considered to be a substantially non-rotatable state of the first engagement element relative to a shaft axis (explained further below).

As will become clearer from various examples to be described, the movable element provides a simple and quick mechanism for switching the end assembly, and in turn a dance exercise pole connected thereto, from a static to a spinning mode, and vice versa. No additional tools are required, and the switching can be done in seconds or less, compared with known systems using tools which can take in the order of minutes to switch from a static to spinning mode, and vice versa. The end assembly of examples is switchable between the first and second configurations with a manual force, and therefore a user can easily switch between configurations without tools to increase force. Indeed, a user of the dance exercise pole can in some examples switch the end assembly between configurations whilst suspended on the pole.

Although examples are envisaged where the movable element is movable between the first and second positions in a direction coincident with a longitudinal axis of the dance exercise pole, many examples described herein relate to rotational movement of the movable element between the first and second positions. Such examples offer a compact implementation of the end assembly, which occupy a low or minimum area in a direction along the longitudinal axis. For a user of a dance exercise pole, it may be desirable for as much of the length of the dance exercise pole to be a continuous and uninterrupted pole surface available to be gripped during a dance sequence. Any protrusions, discontinuity, or other interruption in the continuous smooth and cylindrical surface can restrict the range of movement available to a dancer, and can be distracting if a dancer encounters them during a dance sequence. Hence, with the movable element being rotatable, rather than translatable along the longitudinal axis, any interruption in the continuous surface available to a dancer may be minimised. Indeed, as will become apparent from the description below, the end assembly can be implemented internally in a compact form, minimising any external protrusions such as pins or screws which could even cause an injury to a dancer's hands or feet. Indeed, in the examples where a cam is used to translate a rotational movement of the movable element to a perpendicular or other linear translation, for example to move one of the engagement elements into engagement with another engagement element, a particularly compact yet effective end assembly is implemented.

Moreover, during a dance sequence, where high and sudden forces may be exerted by a user in a longitudinal direction, particularly downwards given the action of gravity on the dancer, a longitudinally translatable movable element may be more susceptible to accidental switching by a user, which can be potentially dangerous if the dance exercise pole is switched from static to spinning, or vice versa, unexpectedly during a dance routine. Hence, a rotatable movable element, as well as being more compact along the longitudinal axis, may be less likely to be accidentally rotated and switched by a user during a dance sequence.

The assembly examples described herein are radially compact too, and hence may be enclosed within a cylindrical volume with a diameter equal to or less than the diameter of the dance exercise pole. Such a diameter in some examples is approximately 50 millimetres, and in other examples is approximately 45 millimetres or even approximately 40 millimetres. As a result, a longitudinal cylindrical surface of the dance exercise pole may be maximised, with minimum interruption by the assembly, which would otherwise restrict the available surface of a dance exercise pole for a dancer to use.

Figure 1A:
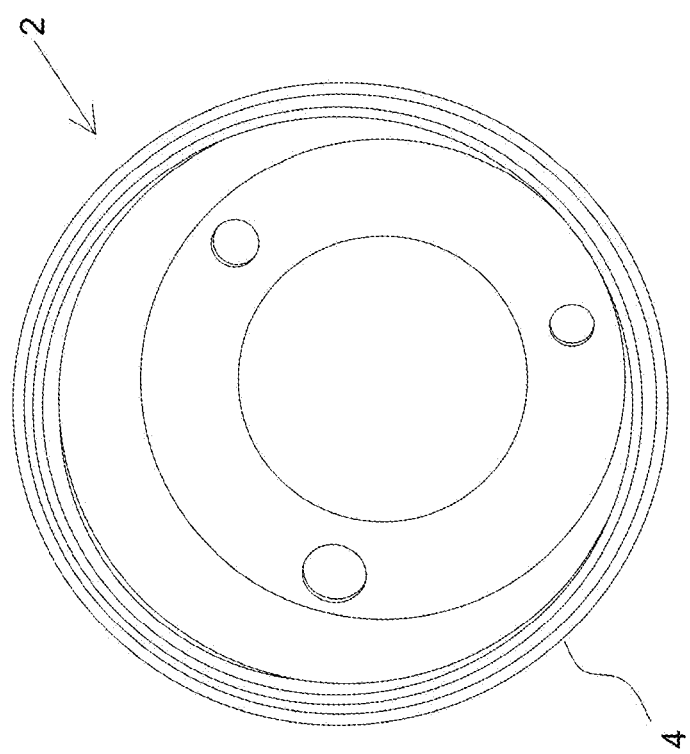

FIG. 1a shows a top view of an example of a handle 2 which may be connected to the movable element. In this example the handle has a flange or cylindrical member 4 which extends from a plane (in the plane of FIG. 1a) in which the handle is connected to the movable element. Such a handle may have a grip on its outer surface to make it easier for a user to grip the handle with their hand and move it from the first position to the second position. Other examples of the handle are envisaged for moving the movable element between the first and second positions.

The movable element in examples is rotatable to be moved between the first and second positions. FIG. 1b shows a side view, FIG. 1c shows a top view, and FIG. 1d shows an underside view, of an example of such a movable element 6, which is for example annular.

The movable element has a first cam 8 with a first cam surface 10. In examples such as that of FIG. 1b the first cam has a first tapered cam profile 12 which tapers, for example decreases in thickness t in a circumferential direction D. As shown in FIG. 1d, the underside has holes for example, so that the handle can be connected to the movable element with screws, though in other examples alternative fixings are envisaged, or the handle may be integrally formed with the movable element. Figure 1f shows the example movable element fixed to and within the cylindrical member.

The first cam may have a first step S1 at one end of the first cam surface and a second step S2 at another end of the first cam surface. The first step is for example larger than the second step, due to the difference in thickness of the first tapered cam profile at the locations of the first and second steps.

Figure 1C:
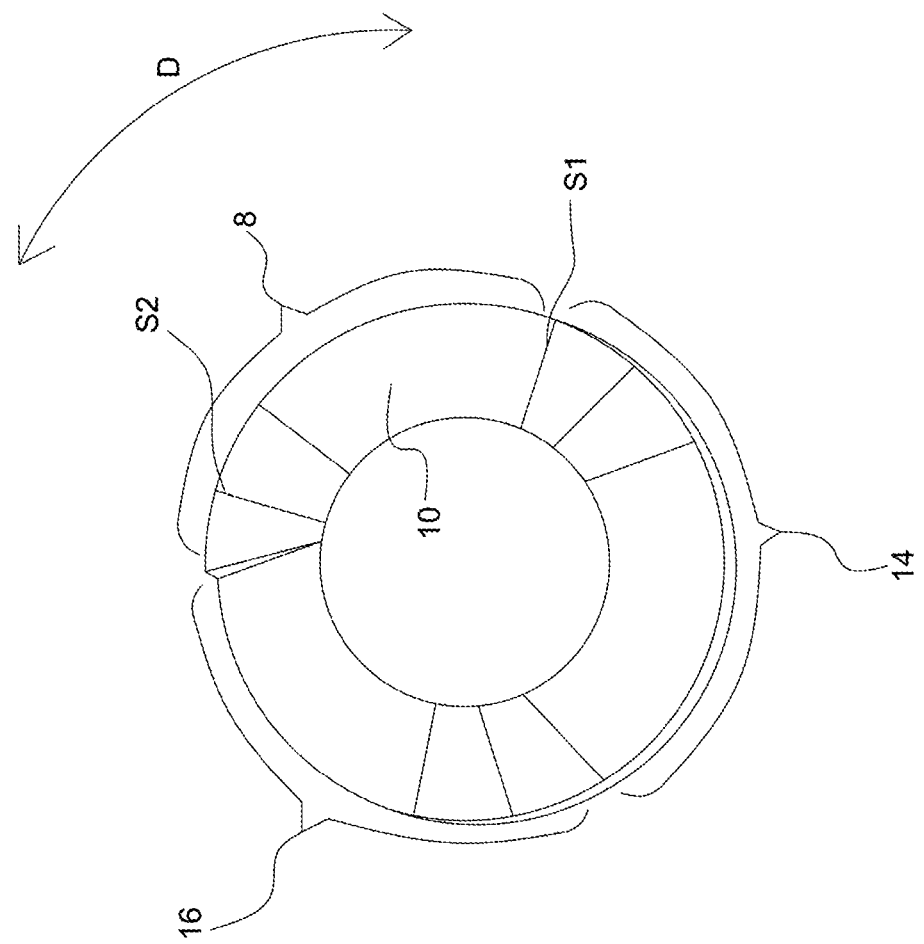
Figure 1D:
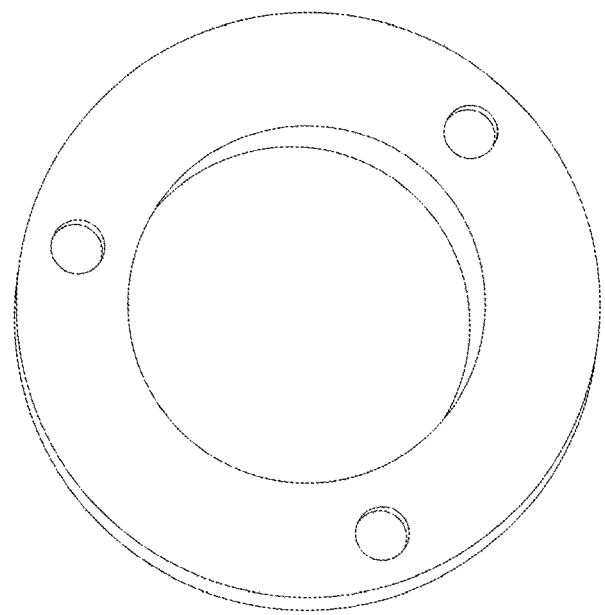
Figure 1E:
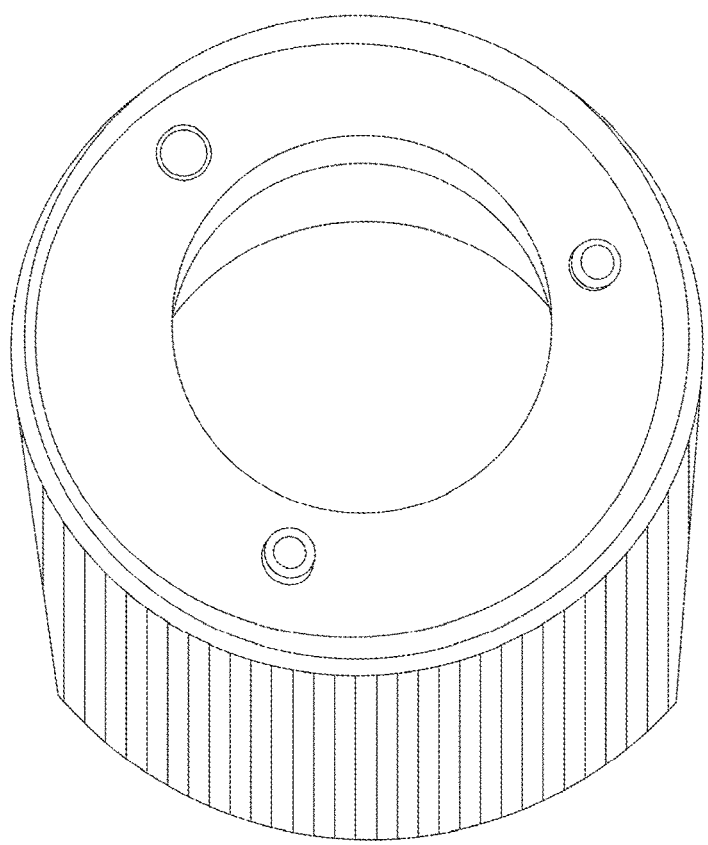
Figure 1F:
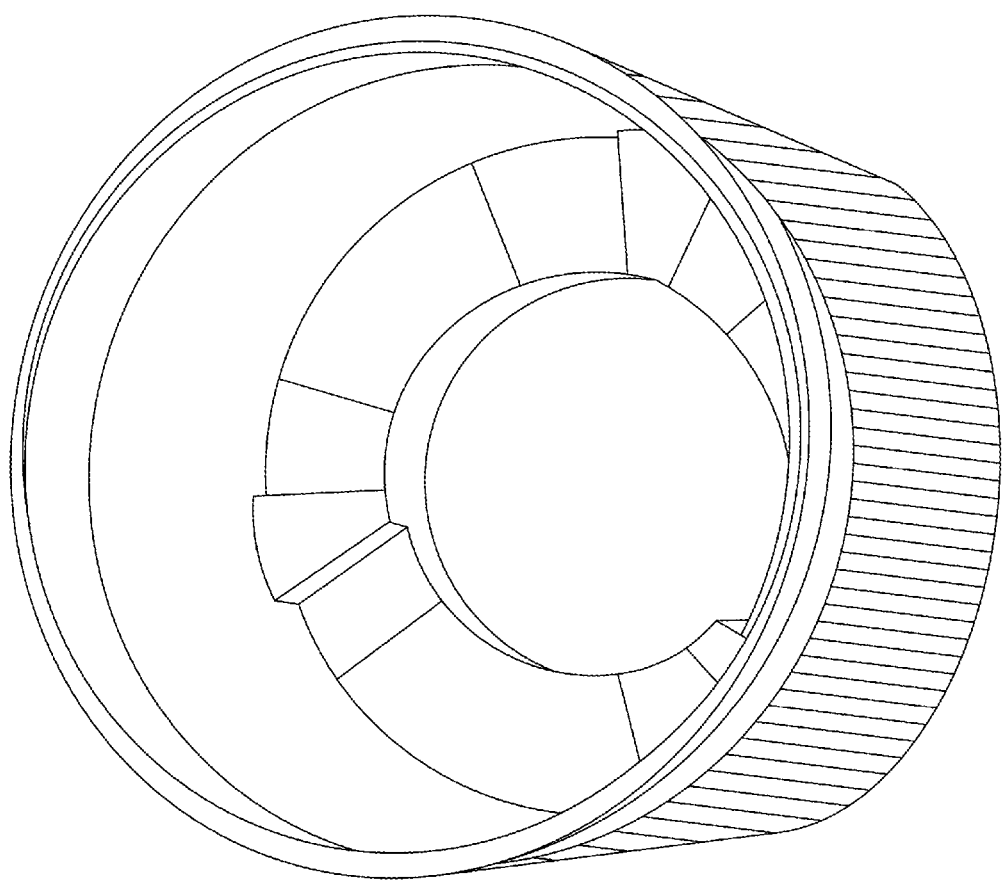

In examples such as that of FIGS. 1b, 1c and 1d, the moveable element has a second cam 14 with a second tapered cam profile and similar features to that of the first cam. The first step S1 for example transitions the first cam to the second cam as a step between the smallest thickness t portion of the first tapered cam profile and the largest thickness t portion of the second tapered cam profile. As will become clear later, the first and second steps may be used to set the first and second positions of the movable element.

In examples such as that of FIGS. 1b, 1c and 1d, the movable element is annular and comprises a plurality of cams distributed circumferentially, for example about an annual perimeter of the movable element. The plurality of cams for example includes the first and second cams described earlier, and in the example shown a third cam 16 with similar features as each of the first and second cams. In other examples there may be more than three cams. One such cam is separated from one adjacent cam by the first step S1 and is separated from another adjacent cam by the second step S2.

Each cam has a tapered cam profile which may taper in one of a clockwise or an anti-clockwise direction. In FIG. 1c, each cam tapers in a clockwise direction.

An underside of the movable element is for example flat, for contact with a support surface of a shaft to be described later.

The second engagement element will now be described, followed by the first engagement element.

In examples such as those of FIGS. 2a to 2d, the second engagement element 18 has a first contact surface 20 for contact with the first cam surface of the first cam. The first cam contact surface is of a cam contact part 22 of the second engagement element, the cam contact part being for example a protrusion from an underside of the second engagement element. The cam contact part tapers in a direction opposite a direction of tapering of a corresponding tapered cam profile of a cam of the movable element. Hence, a profile of the cam contact part is shaped to at least partly correspond with the tapered cam profile of a cam. So, with the second engagement element being an annular element, for example, if a cam contact part tapers in a clockwise direction the tapered cam profile of a corresponding cam of the movable element tapers in an anti-clockwise direction; the vice versa case may apply in alternative examples.

In examples such as those of FIGS. 2a to 2d, the second engagement element has a plurality of cam contact parts distributed circumferentially. In the examples shown there are three cam contact parts. Each cam contact part has a cam contact surface and tapers in the opposite one of the clockwise or anti-clockwise direction to the tapering of a respective cam of the movable element.

A cam contact surface may be separated from a first adjacent cam contact surface of a first adjacent cam contact part 26 by a third step S3, and from a second adjacent cam contact surface of a second adjacent cam contact part 28 by a fourth step S4.

The second engagement element comprises a plurality of protrusions P2, referred elsewhere as the second plurality of protrusions, for example teeth. More details will be explained further below.

Figure 3A:
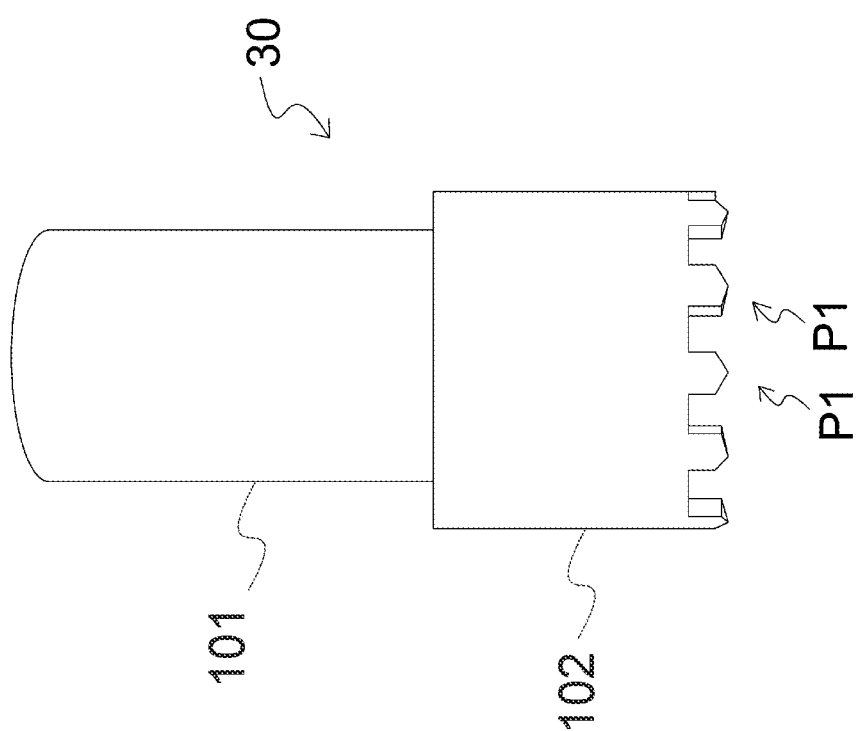
FIGS. 3a to 3b show various views of a tubular body of examples.
Figure 3B:
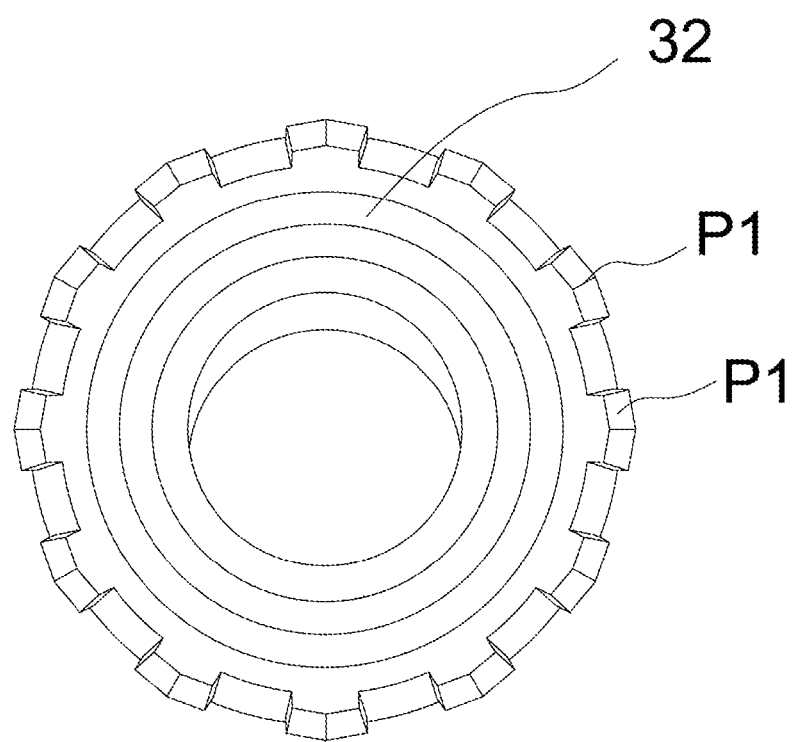

The first engagement element 102 is for example an annular element with a first plurality of protrusions P1, for example teeth, engageable with the second plurality of protrusions. Referring to FIGS. 3a to 3b, the first engagement element is for example part of a tubular body 30 at one end, and which is also configured at another part as a connector 101 for connection to a dance exercise pole. The tubular body acts to connect the first engagement element to the connector. The connector may formed as a tube of metal at one end of the tubular body which is for example expandable or contractable using a hex key or other appropriate tool, to form a joint with an end of a dance exercise pole or portion thereof which is slid over the tube of metal. The skilled person would appreciate however that other connection mechanisms may be used, for example three tapered bolts as shown in FIG. 9b, and that the connector may be differently formed for connection to a dance exercise pole or part thereof.

The tubular body may comprise, for example house or enclose, a bearing system 32 which contacts a bearing surface of for example a shaft (described below) and assists rotation of the connector (and in turn any dance exercise pole connected thereto) relative to the base. The bearing system may include thrust bearings or other suitable bearing types as the skilled person will appreciate. Further details will be explained below.

In some examples, the end assembly has a third engagement element engageable with the second engagement element. The third engagement element is fixed in the end assembly against rotational movement relative to the base, and so when engaged with the second engagement element, the second engagement element (which may in turn be engaged with the first engagement element and in turn the connector) may also be restricted or locked against rotational movement relative to the base.

Figure 4A:
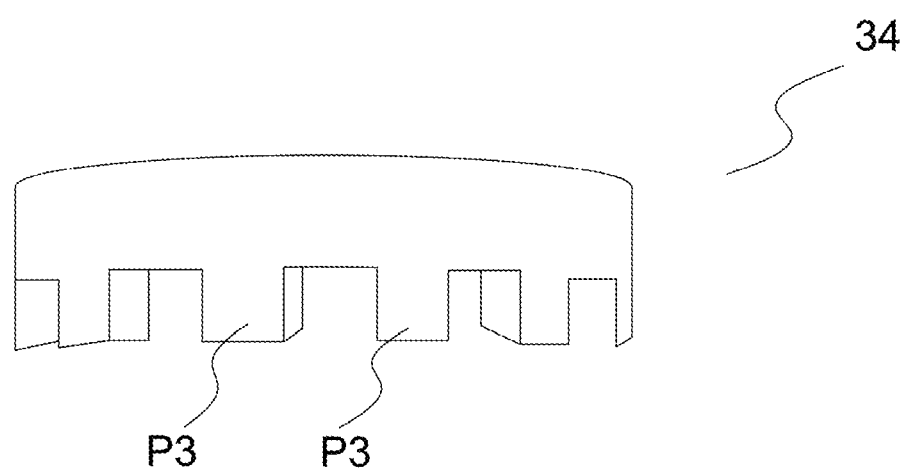
FIGS. 4a to 4c show various views of a third engagement element of examples.
Figure 4B:
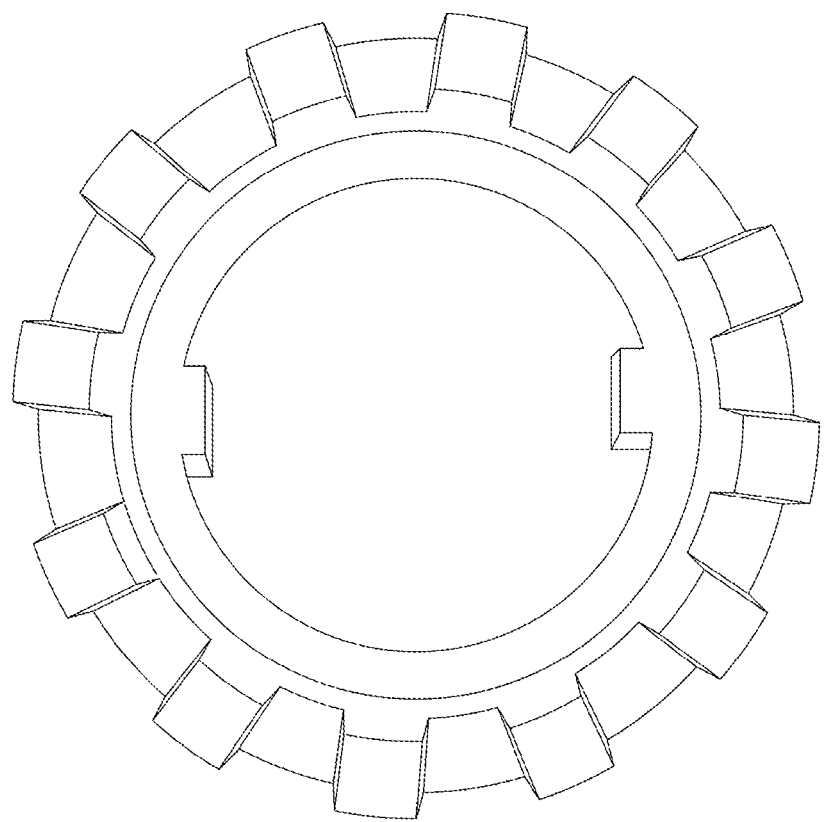
Figure 4C:
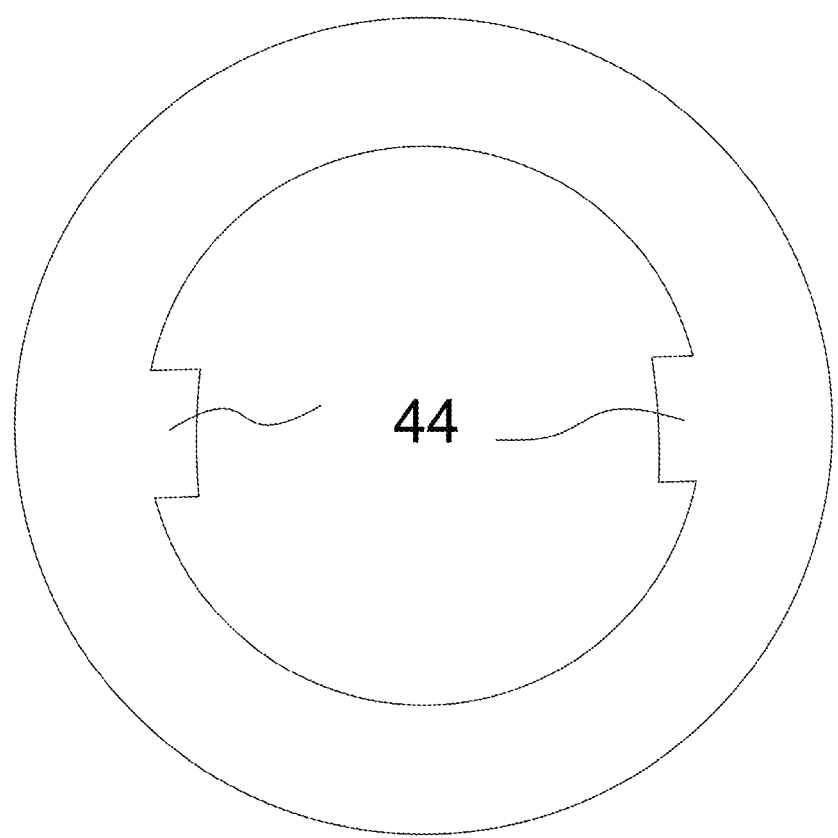

The third engagement element is for example annular and is for example as shown by label 34 in FIGS. 4a to 4c, comprising a third plurality of protrusions P3, for example teeth.

In some examples, the end assembly comprises a shaft, which may otherwise be considered an axle or other element on which various parts of the end assembly are mounted on or to. FIG. 5 shows an example of such a shaft with a shaft axis SA along its length. The shaft in these examples is a cylindrical element which reduces in diameter at certain locations along the shaft axis, and as a result has corresponding steps 38 in the shaft surface on which a part of the end assembly, such as an engagement element, may be mounted with a desired location along the shaft axis.

Figure 2A:
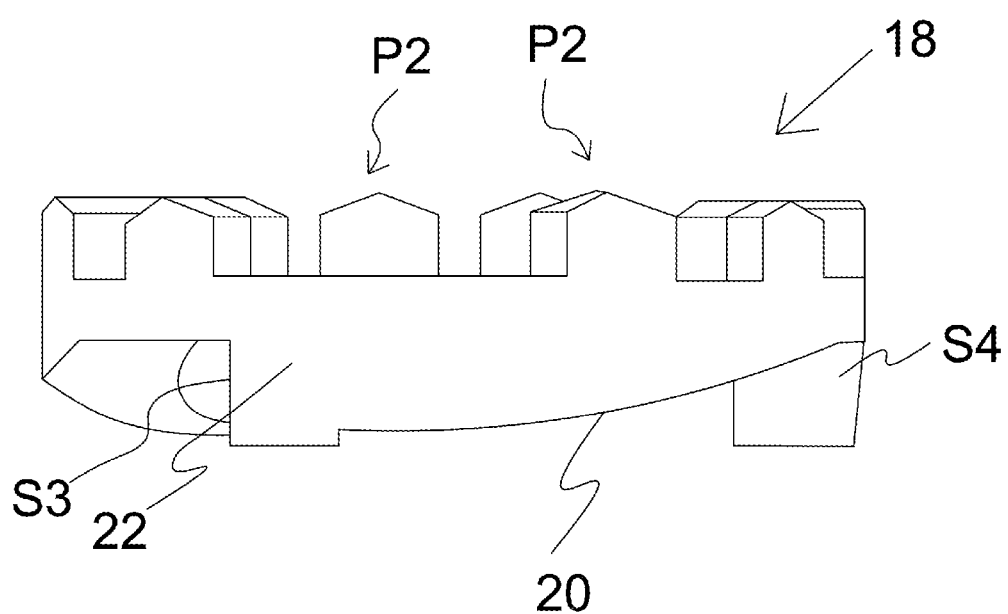
FIGS. 2a to 2d show various views of a second engagement element of examples.
Figure 2B:
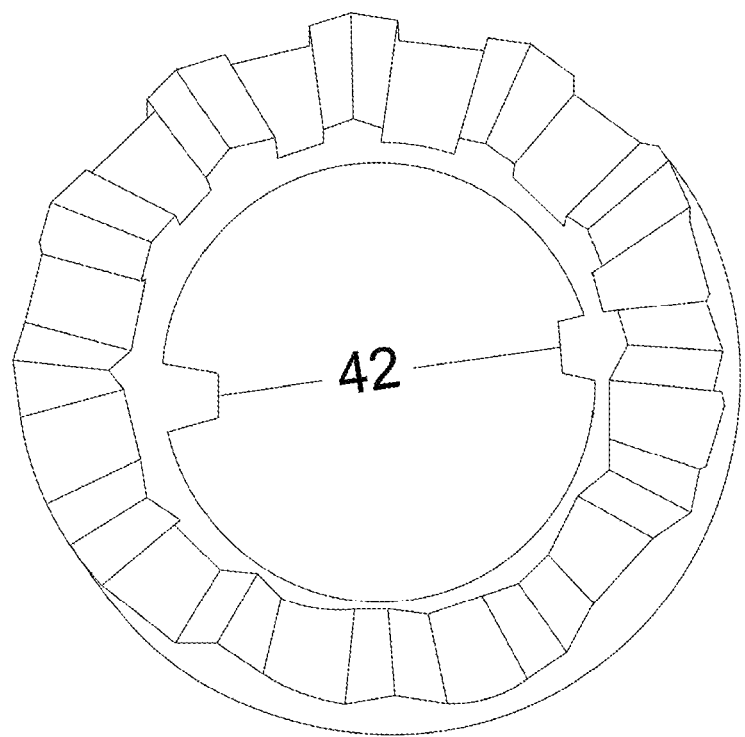
Figure 2C:
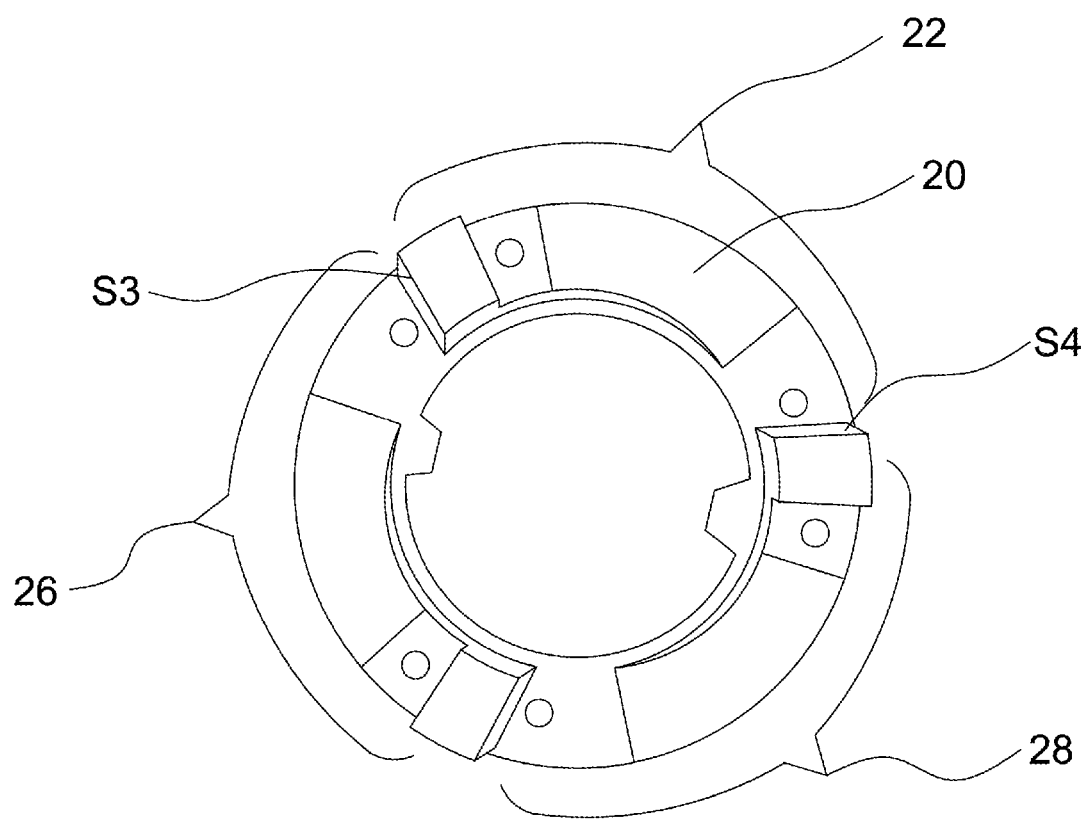
Figure 2D:
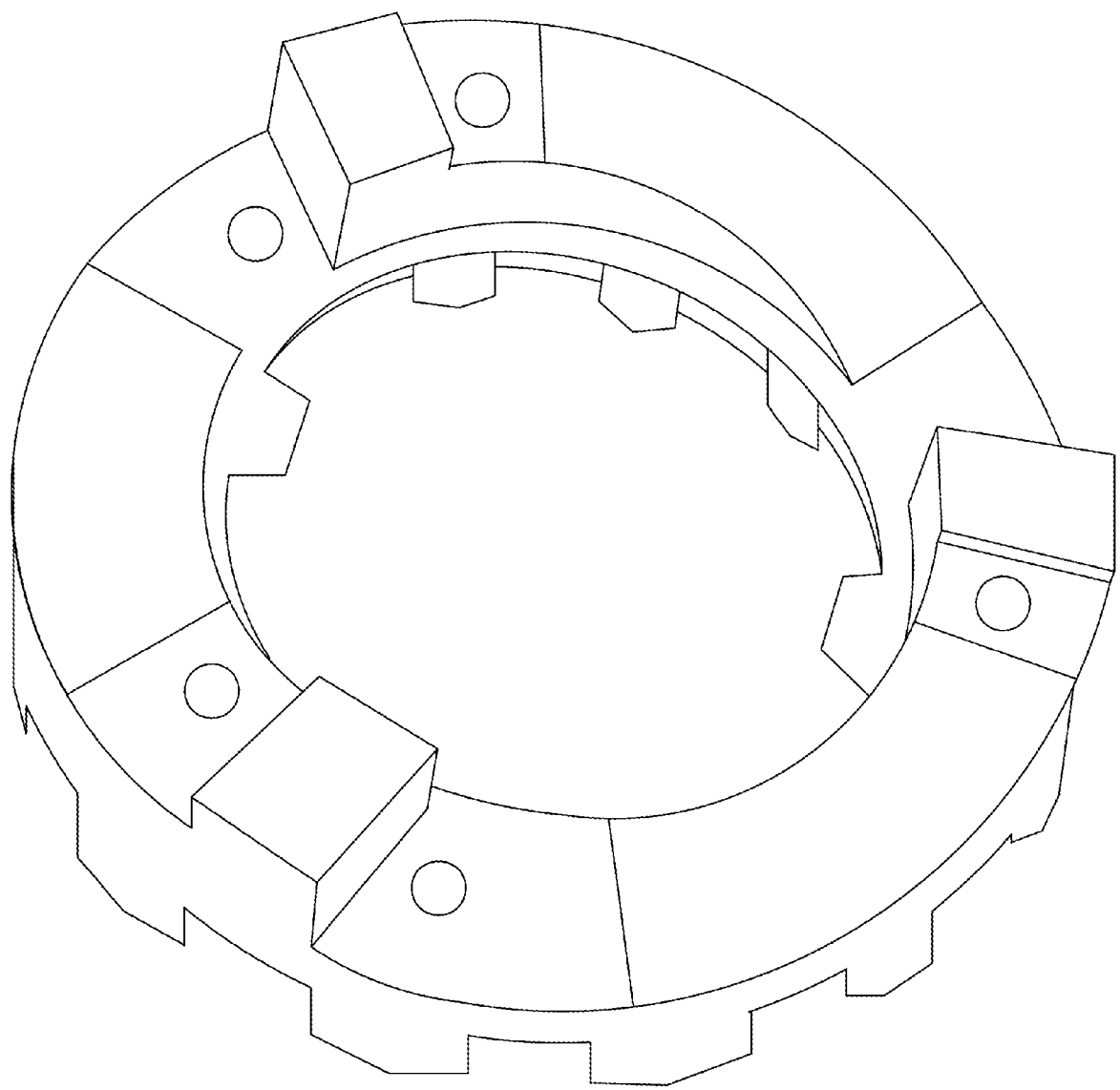

In some examples, such as that of FIG. 5, the shaft 36 is configured for at least one element or part of the end assembly to be mounted so as to be fixed against rotation relative to the base. In examples, the shaft may comprise a channel 40 parallel the shaft axis SA, or in some examples a pair of opposing such channels, which receive an inward protrusion of the element or part being mounted. For example, the second and third engagement elements may each have at least one of such inward protrusions 42, 44 (referred to herein also as second and third inward protrusions, respectively) as shown in FIG. 2b and FIG. 4c for example. The third engagement element may be pressure fitted, or fitted by another technique, to fix the third engagement element to the shaft so that the third engagement element has minimum movement relative to the shaft, as the third engagement element doesn't need to move relative to the shaft during operation of the assembly. The second engagement element is mounted on the shaft with the inward protrusion(s) inserted in the channel(s), but is not fixed against movement, so as to be movable towards or away from the first engagement element.

Having now described various component parts of the end assembly, the assembly of the component parts together will be described, together with operation thereof.

Figure 5A:
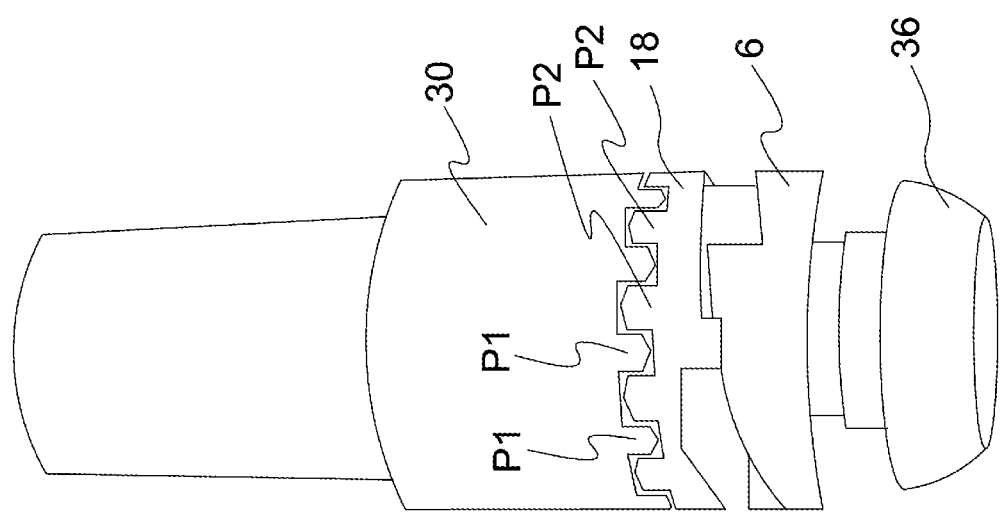
Figure 5B:
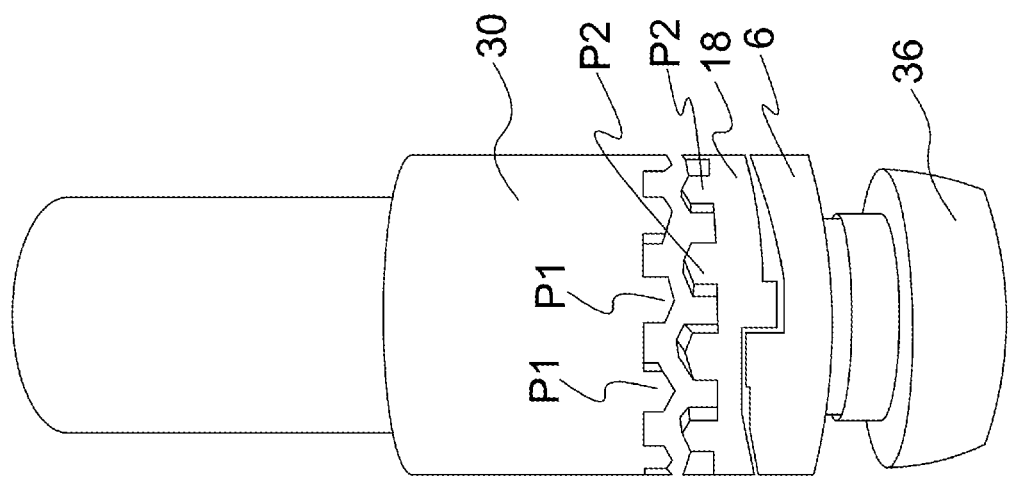

FIG. 5a shows an example of parts of the end assembly, with the end assembly in the second configuration. FIG. 5b shows the same parts with the end assembly in the first configuration. The parts are labelled in FIGS. 5a and 5b with the same reference numerals as used previously, and corresponding descriptions apply here.

In the first configuration, the first engagement element, for example the protrusions P1, is disengaged from the second engagement element, for example the protrusions P2. Hence, the tubular body 30, mounted on the shaft at a first shaft axis position, can rotate about the shaft axis and therefore relative to the base (not shown in this illustration), assisted by for example the bearing system described earlier mounted on a bearing surface of the shaft.

In FIG. 5a, the end assembly has been switched to the second configuration with the first and second engagement elements engaged with each other. Switching from the first to second configuration in these examples is effected by rotating the movable element 6 from a first position to a second position (which may be considered to be respectively a first and second rotational position relative to the shaft). In doing so, each cam surface of the cams of the movable element are rotated, and the cam contact surfaces of the respective cam contact parts of the second engagement element slide along respective cam surfaces. The cam contact surfaces therefore can be considered to follow at least part of the profile of the cams, and therefore, due to the tapered shape of the cam profiles, the second engagement element is moved in a direction along the shaft axis, towards the first engagement element, so that the first and second engagement elements engage. Thus the second engagement element may be considered to move from a second shaft axis position on the shaft axis to a third shaft axis position on the shaft axis. As can be seen, in the second configuration, a step of the movable element and a step of the second engagement element engage, in effect providing a stop against further rotation of the movable element relative to the second engagement element. Thus, this stop sets the second position of the movable element.

Figure 7:
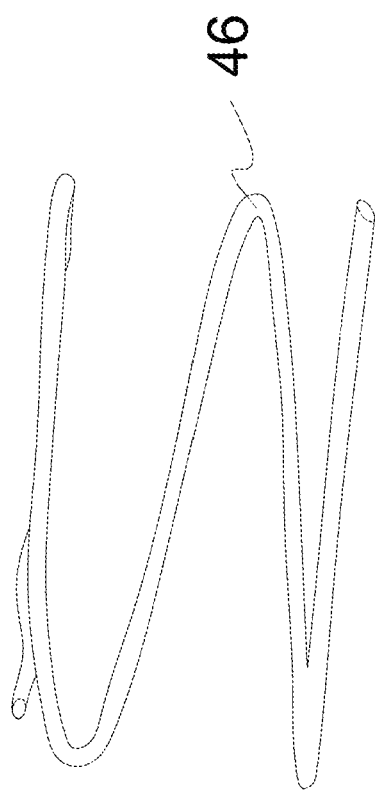
FIG. 7 shows an example of a biasing element.
Figure 8B:
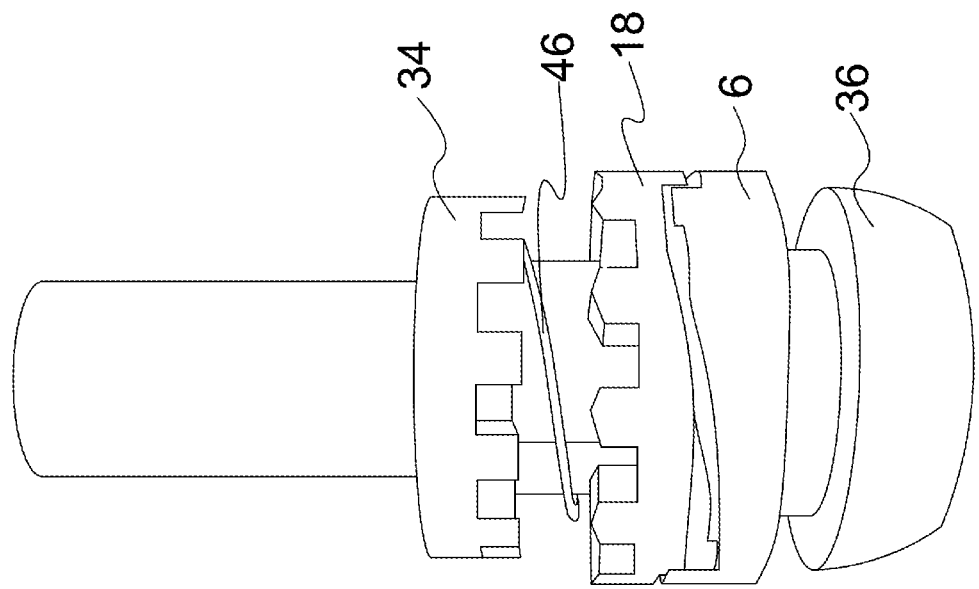
FIG. 8b shows an example of an end assembly partially assembled according to examples.
Figure 8A:
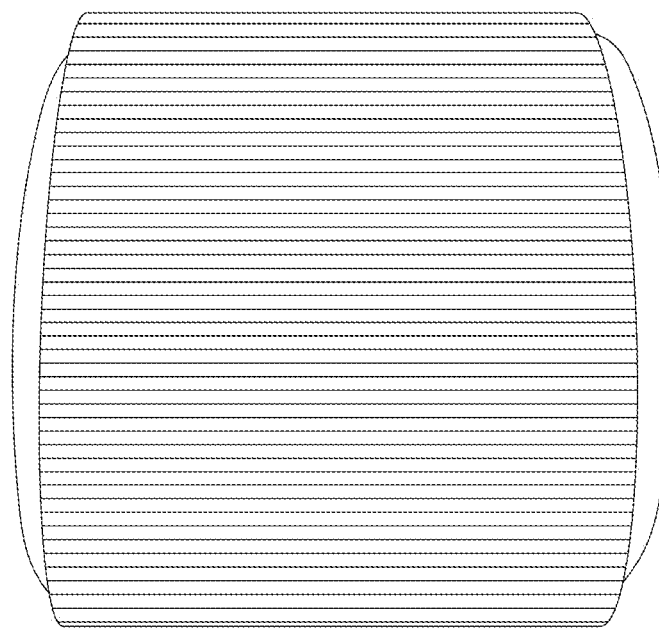
FIG. 8a shows an example of a handle in side view according to examples.

To switch the end assembly back to the first configuration, the movable element is rotated in the reverse direction, from the second position to the first position, and the cam contact surfaces slide along the cam surfaces in a reverse direction. When a step of the movable element and a step of the second engagement element engage, the movable element is in the first position, the steps acting as a stop against further movement of the movable element. As can be seen, in the first configuration the cam contact parts and the cams interlock, and the second engagement element is moved away from the first engagement element. A biasing element may, such as a spring (46 shown in FIGS. 7 and 8b), be used to bias the second engagement element away from the first engagement element.

Figure 6A:
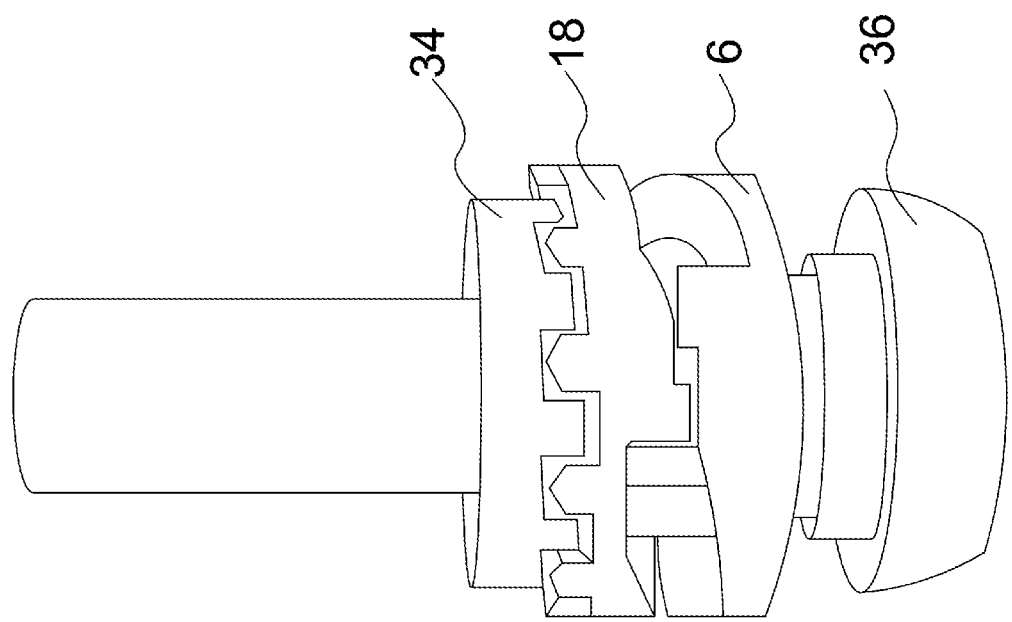
Figure 6B:
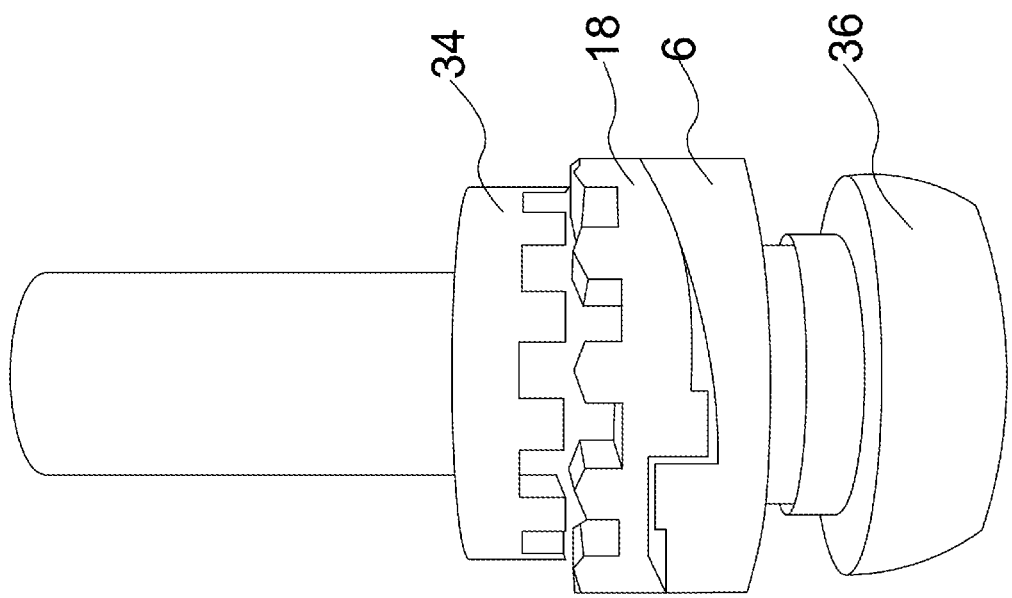

FIGS. 6a and 6b show the end assembly of FIGS. 5a and 5b, but with the tubular body removed, so as to show the third engagement element and its operation.

The third engagement element is mounted on the shaft with the inward protrusions inserted in the channels. Hence, the third engagement element is fixed against rotational movement relative to the base. With the assembly in the first configuration (FIG. 6b), the second engagement element is disengaged from the third engagement element (for example the third plurality of protrusions P3), and also the first engagement element, so the connector can rotate relative to the base and also to the third engagement element.

However, with the end assembly in the second configuration, the second engagement element is engaged with the third engagement element, and is restricted, for example fixed or locked, against rotation relative to the base. In turn, with the first engagement element also engaged with the second engagement element, the first engagement element and therefore the connector is also restricted against the rotation relative to the base, via the third engagement element.

For the second engagement element to engage both the first and third engagement elements, the second engagement element has for example protrusions or teeth with a radial width (referred to herein as a second radial width) at least equal to a sum of the radial width (referred to herein as a first radial width) of protrusions of the first engagement element and of a radial width (referred to herein as a third radial width) of protrusions of the third engagement element.

Although not shown in FIGS. 5a to 6b, the movable element is connected for example to a handle described earlier, for a user to twist or rotate the movable element easily.

Figure 11A:
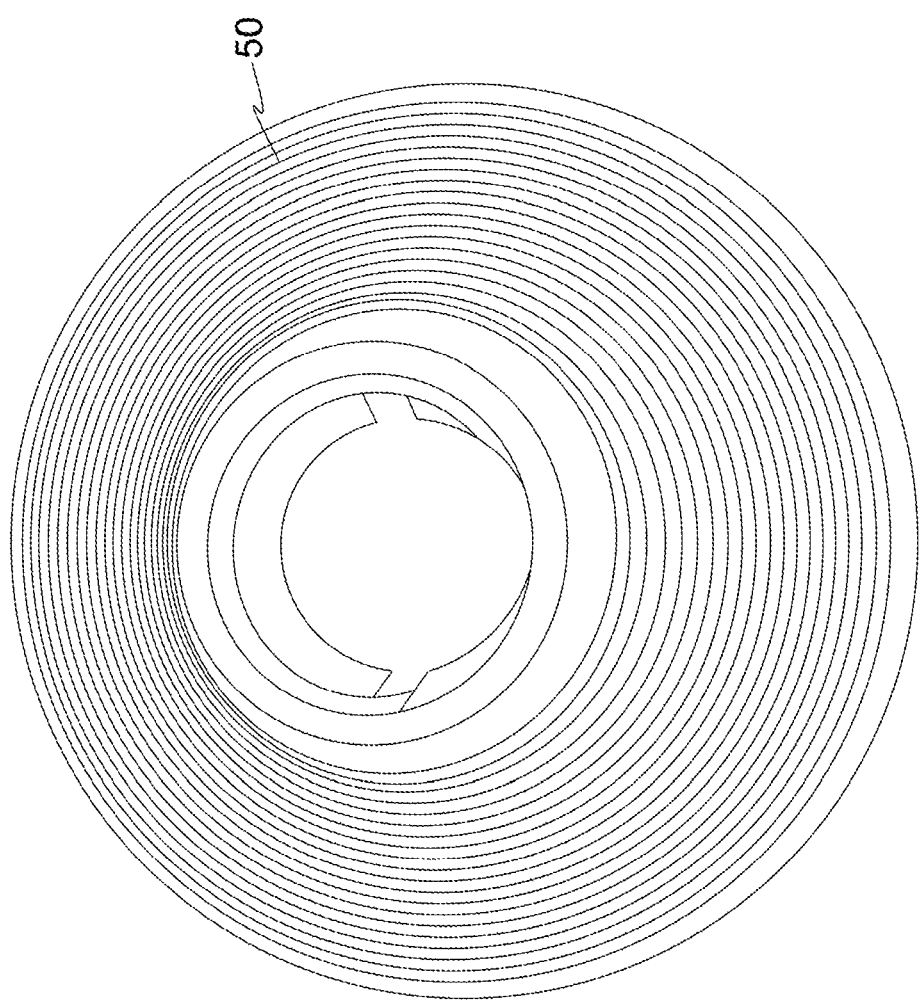
FIGS. 11a to 11c show various views of a base of examples.
Figure 11B:
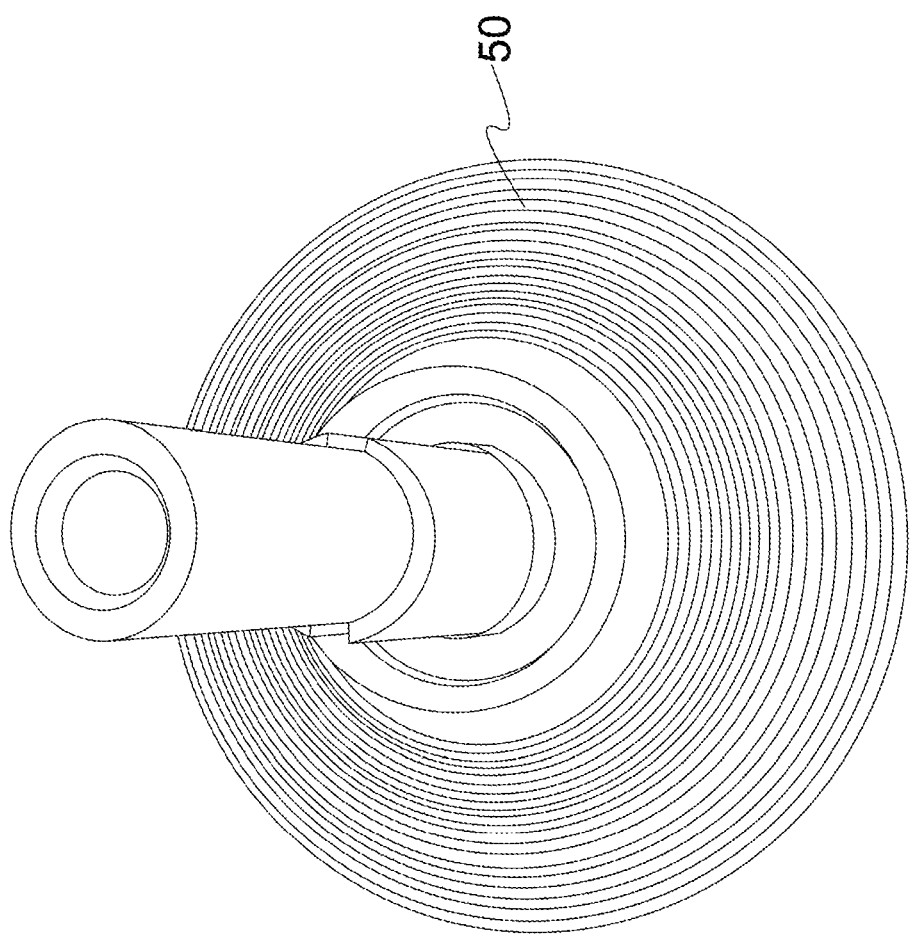
Figure 11C:
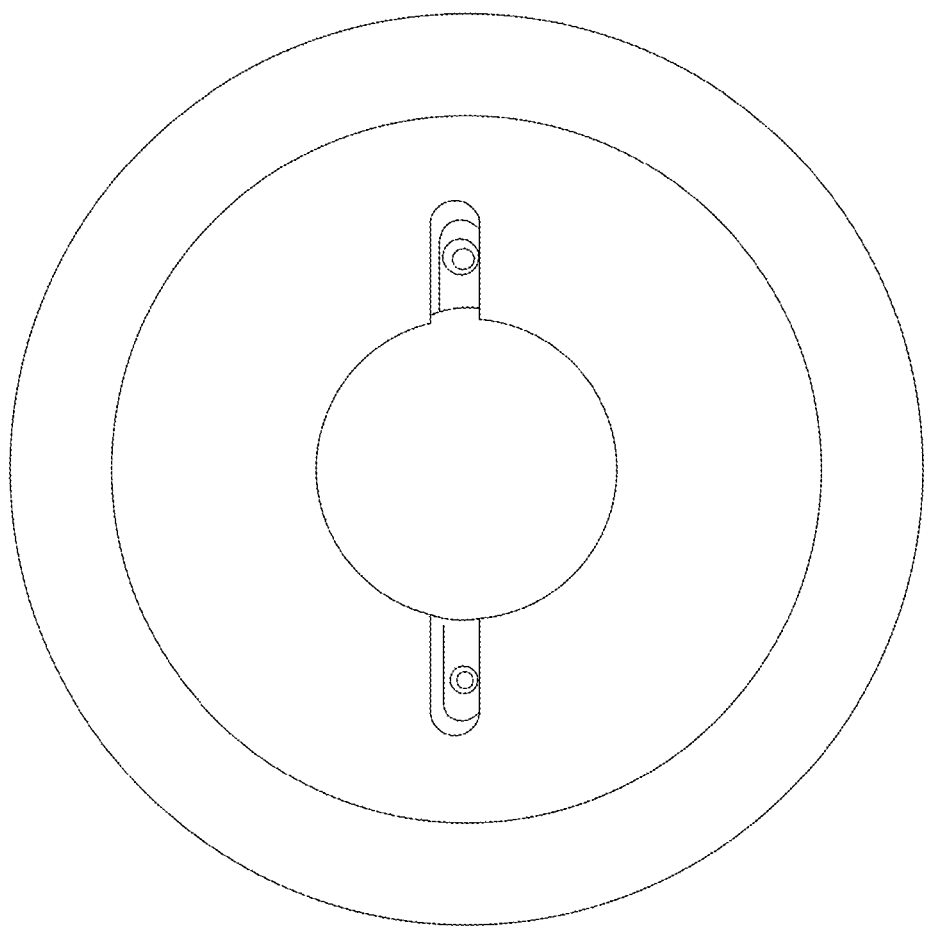
Figure 12:
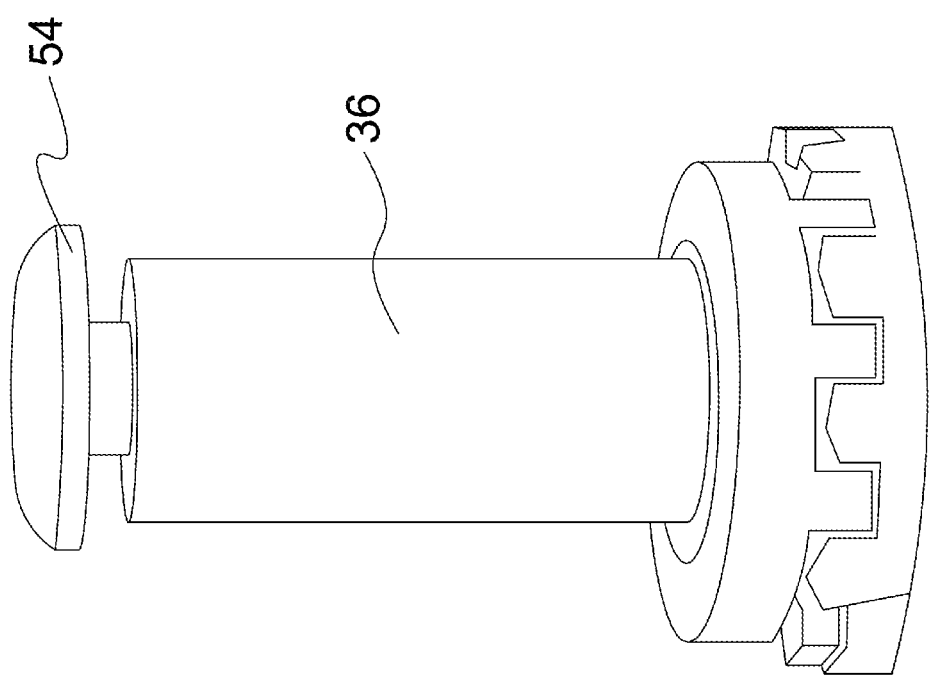
FIG. 12 shows an upper part of the shaft with a bolt inserted, according to examples.

FIG. 9a shows schematically a side view of the end assembly, including the handle 2 and an end part 50 (which in the examples of FIG. 9a is a base 50) which is for example a plate (shown in FIG. 11a) connected to the shaft (shown in FIG. 11b). FIG. 11c shows an underside of the base plate with slots in which screws inserted in the shaft are received, to lock or hold the shaft against rotational movement relative to the base. The base plate may be attached to the shaft in a manner to allow some variation in angle of the base plate relative to the shaft, to improve contact of the base plate with surfaces which are not perfectly horizontal.

FIG. 9b shows in cross-section the end assembly with various parts labelled with the same reference numerals as earlier. Bearings of a bearing system are labelled 52. A bolt 54 is shown in this example for connecting the tubular body 30 to the end of the shaft. Further, a block 56 and a circlip 58 are shown in this particular example.

Figure 10:
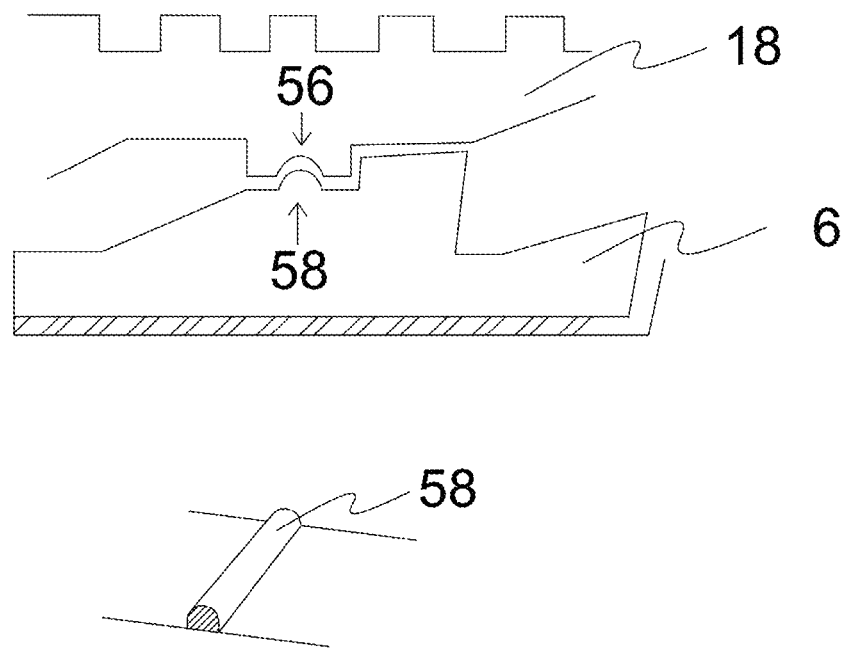
FIG. 10 shows schematically an indent and bump of examples.

FIG. 10 shows schematically an example where a first cam contact surface of the first cam contact part of the second engagement element has an indent 56, which may otherwise be considered a recess or hollow. A first cam surface has a bump 58, or other raised portion, which is shaped to be receivable by the indent with the assembly in the second configuration. The bump, when received by the indent, provides resistance against rotation of the movable element towards the first position which would tend towards disengaging the second engagement element. Hence, the bump and indent may be considered a lock against switching of the assembly to the first configuration whilst the dance exercise pole is in use. The bump and/or indent may have a rounded profile which may correspond with each other, the rounded profile providing a smooth transition of the bump into the indent and out of the indent when the assembly is switched to the first configuration. In some examples, there may be a plurality of such indents and corresponding bumps located circumferentially around the second engagement element and the movable element.

Figure 13:
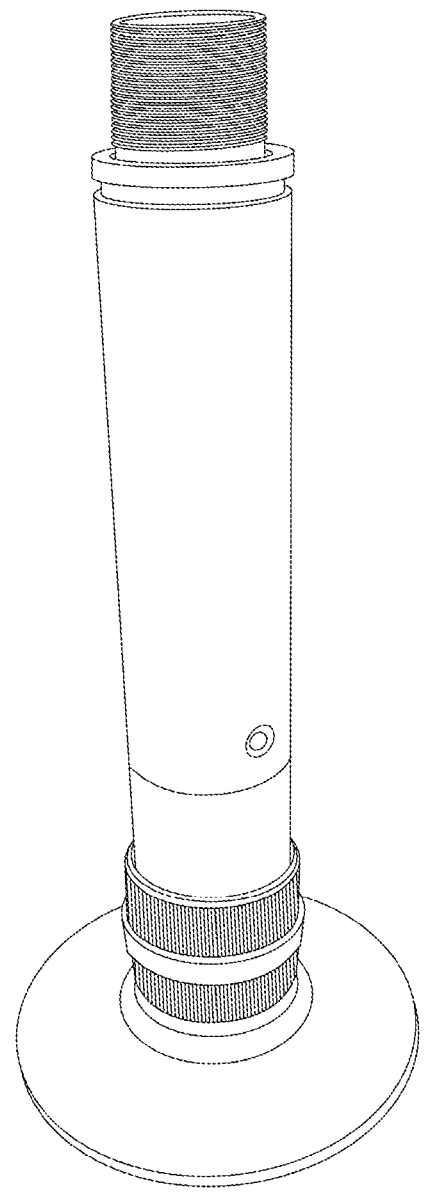
FIG. 13 shows an example of the end assembly of examples.

FIG. 13 shows an external view of the end assembly with the tubular body connected to a portion of a dance exercise pole, for connection in turn with a further portion of the dance exercise pole. The protrusions of the first engagement element and the second engagement element are hidden within the handle 2.

In some examples at least one of the protrusions of an engagement element described above has an angled surface, or a pair of diverging angled surfaces, which guide an approaching protrusion of an engagement element towards engagement with an inter-protrusion surface during switching the assembly from the first configuration to the second configuration. Such angled surfaces can give a protrusion a pointed profile, with the point helping to guide an approaching protrusion for smooth engagement of two engagement elements. In other examples the surface may be rounded, again to help guide an approaching protrusion. Vertical surfaces of the protrusions may or may not be angled, to give a desired engagement against rotation where required, but also to aid engagement or disengagement with other protrusions.

Further examples of an end assembly will now be described with features having similarities to those described previously. These examples relate to an end assembly which is usable to hold a dance exercise pole in a freestanding configuration, without an upper end of the pole being connected to a ceiling or equivalent. In these examples, there is a first and second engagement element configured to be engaged and disengaged with each other to switch the end assembly between the second and first configurations respectively.

Figure 14B:
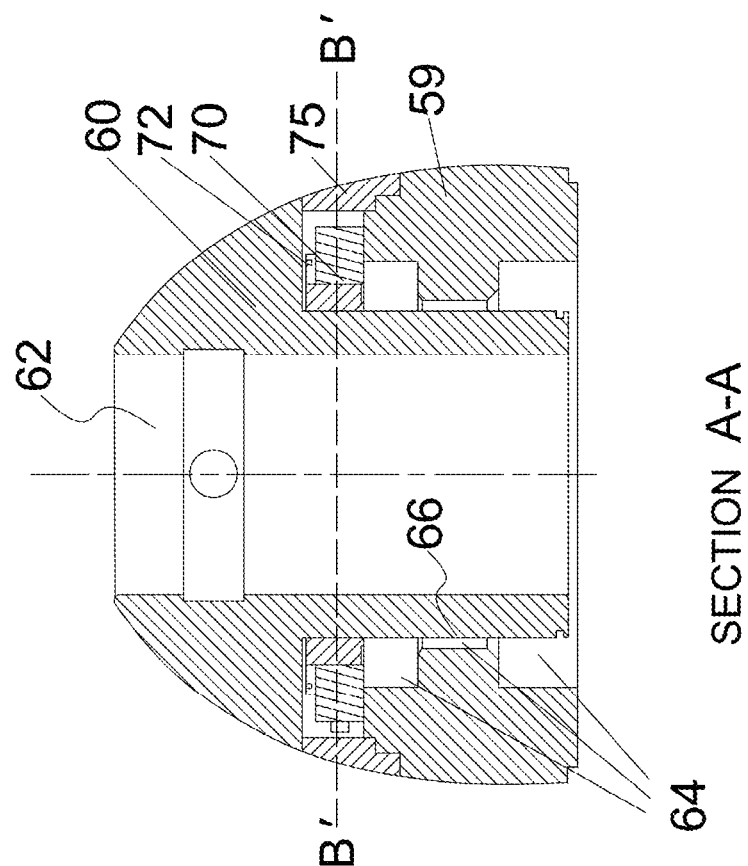
FIGS. 14a and 14b show various views of an end assembly according to further examples.
Figure 14A:
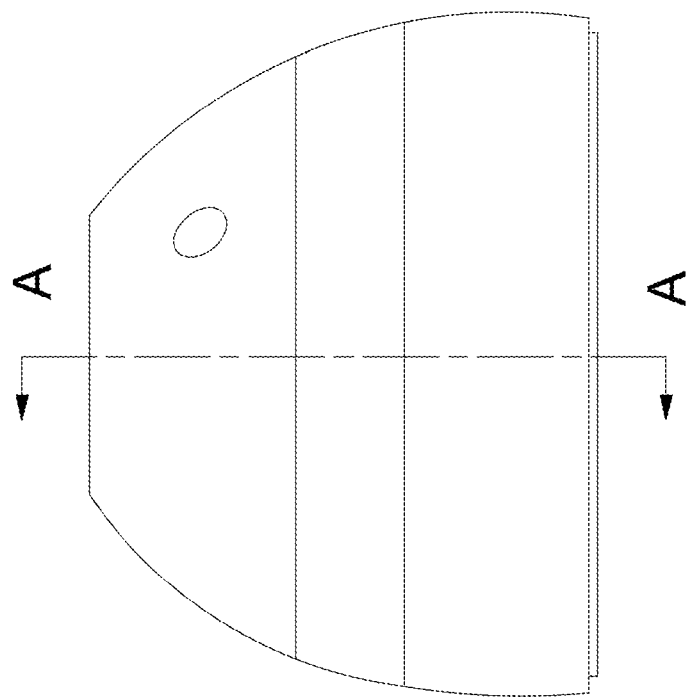
Figure 15A:
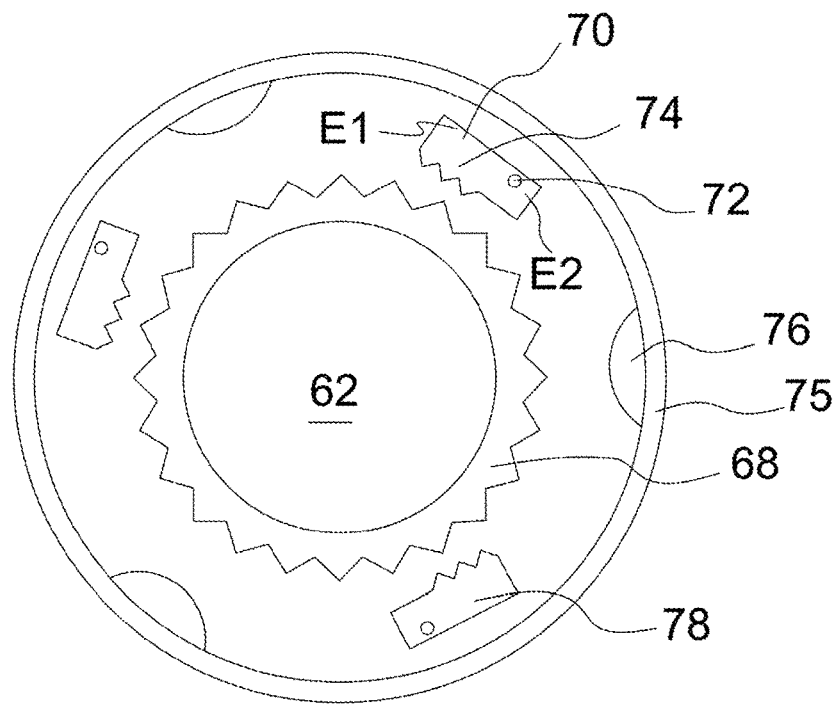
FIGS. 15a and 15b show operation of the end assembly in cross-section according to examples.
Figure 15B:
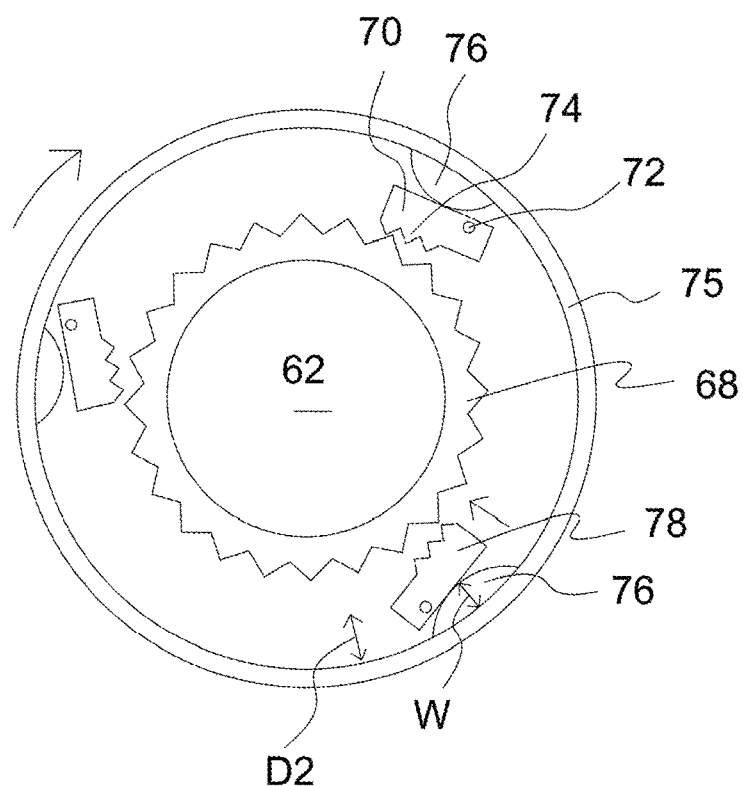

FIG. 14a shows a side view and FIG. 14b shows a cross-section. FIGS. 15a and 15b show operation of the end assembly of these examples in cross-section in the plane B-B'.

A first body 59 is for example a cylindrical body or flange and is for example connected to a base, for example a base plate (not shown), which in turn may be attached with screws or other appropriate fastenings to a stage or other surface on which a freestanding dance exercise pole is to be mounted. There is a second body 60 which has for example a hollow centre 62 for receiving and being connected to an end of a dance exercise pole or part thereof. The second body is received within the first body, for example with the first body comprising a bearing system of bearings 64 in contact with a cylindrical bearing surface 66 of the second body.

A first engagement element 68 is an annular element and comprises a plurality of protrusions, for example teeth, distributed circumferentially to form a ring of protrusions extending outwards.

A second engagement element is engageable and disengageable with the first engagement element to switch the end assembly from the first configuration to the second configuration and vice versa. A second engagement element 70 is in these examples pivotable between a first pivoted position with the assembly in the first configuration as shown in FIG. 15a and a second pivoted position with the assembly in the second configuration as shown in FIG. 15b. The second engagement element is for example connected to the first body 59 with a pivot 72, which is for example a pin, rivet or other suitable fastener such as a screw. Each second engagement element may be considered to function as a catch or a pawl.

The second engagement element comprises for example a protrusion or plurality of protrusions 74, such as teeth, located at one end of a block and configured to engage with the first engagement element. The block may be considered the second engagement element, and may be considered to be an arm, and has a first end E1 and a second end E2, with the protrusion or plurality of protrusions located closer to the first end than the second end, and with the pivot located closer to the second end than the first end.

As shown in FIGS. 15a and 15b, there may be a plurality of such second engagement elements distributed annularly, for example circumferentially relative to a circle. As shown, there may be three such second engagement elements.

The movable element 75 is in these examples an annular element concentric with the first engagement element, such that they each share a common centre and/or their centre is each coincident with a common longitudinal axis. The second engagement element(s) are located between the movable element and the first engagement element. The movable element has at least one cam 76 located on an inner side of the movable element. Each cam 76 is for example similar to a cam described previously in that it has a first tapered cam profile. In examples shown with a plurality of cams, each cam is distributed circumferentially relative to the movable element in correspondence with the position of a respective second engagement element. Each cam may have a second tapered cam profile which tapers in an opposite direction to the first tapered cam profile. Each cam profile may be a rounded profile.

The movable element is rotatable and, with the end assembly in the first configuration, the movable element is rotated to move each cam towards and into contact with a cam contact surface 78 of the second engagement element. As the cam surface with the tapered profile slides along the cam contact surface, the second engagement element is pivoted to move the protrusion(s) inwards and towards the first engagement element, from the first pivoted position to the second pivoted position, until the second engagement element engages with the first engagement element.

In some examples such as those shown, a minimum distance D2 between the second engagement element and the movable element is less than a maximum width W of the first tapered cam profile. Thus, the cam cannot be moved at most beyond the pivot of the second engagement element, as the space between the movable element and the second engagement element is too small. Hence, a second position of the movable element is set by the location of the second engagement element relative to the movable element.

To switch from the second configuration to the first configuration, the movable element is rotated in the opposite direction and the second tapered cam profile contacts a cam contact surface of an adjacent second engagement element, which, as it slides along the second tapered cam profile tends to pivot the adjacent second engagement element from the second pivoted position to the first pivoted position. Again, due to the spacing of the pivot of the adjacent second engagement element relative to the movable element, the cam can only move so far before reaching the first position of the movable element which corresponds with the first configuration. In other examples, instead of one cam pivoting one second engagement element to the first pivoted position when the movable element is rotated one way, and pivoting an adjacent second engagement element to the second pivoted position when the movable element is rotated the other way, there may in other examples be a pair of cams per second engagement element, positioned accordingly, such that one cam pivots the second engagement element to the first pivoted position and the other cam of the pair pivots the second engagement element to the second pivoted position.

Figure 16A:
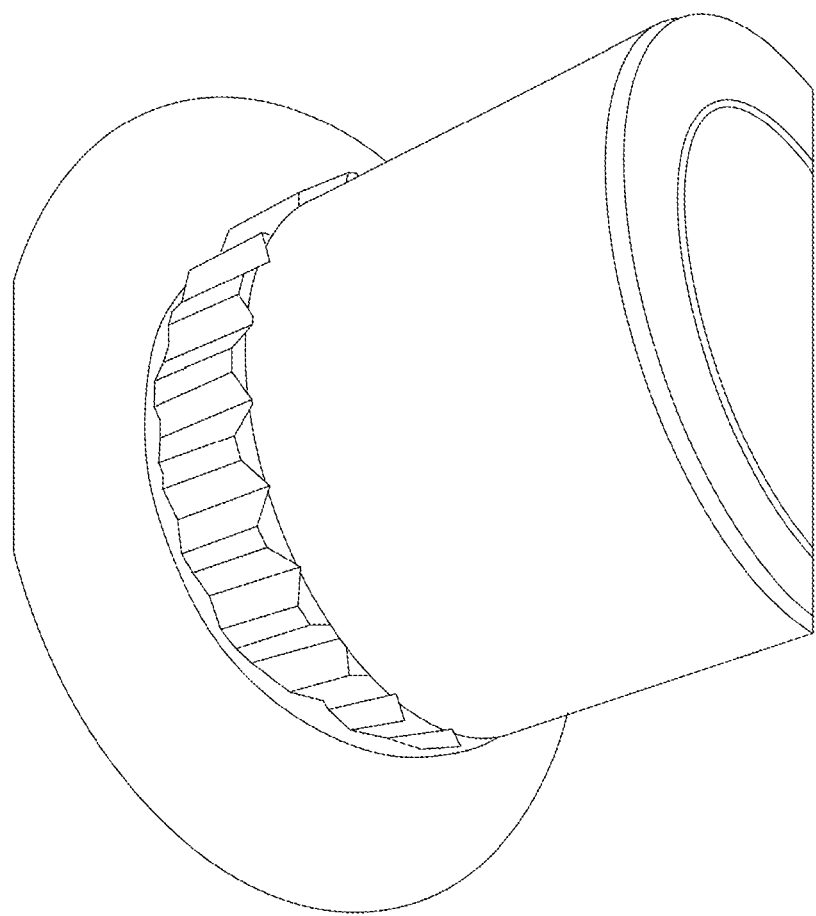
FIGS. 16a and 16b show parts of a partially disassembled end assembly of examples.
Figure 16B:
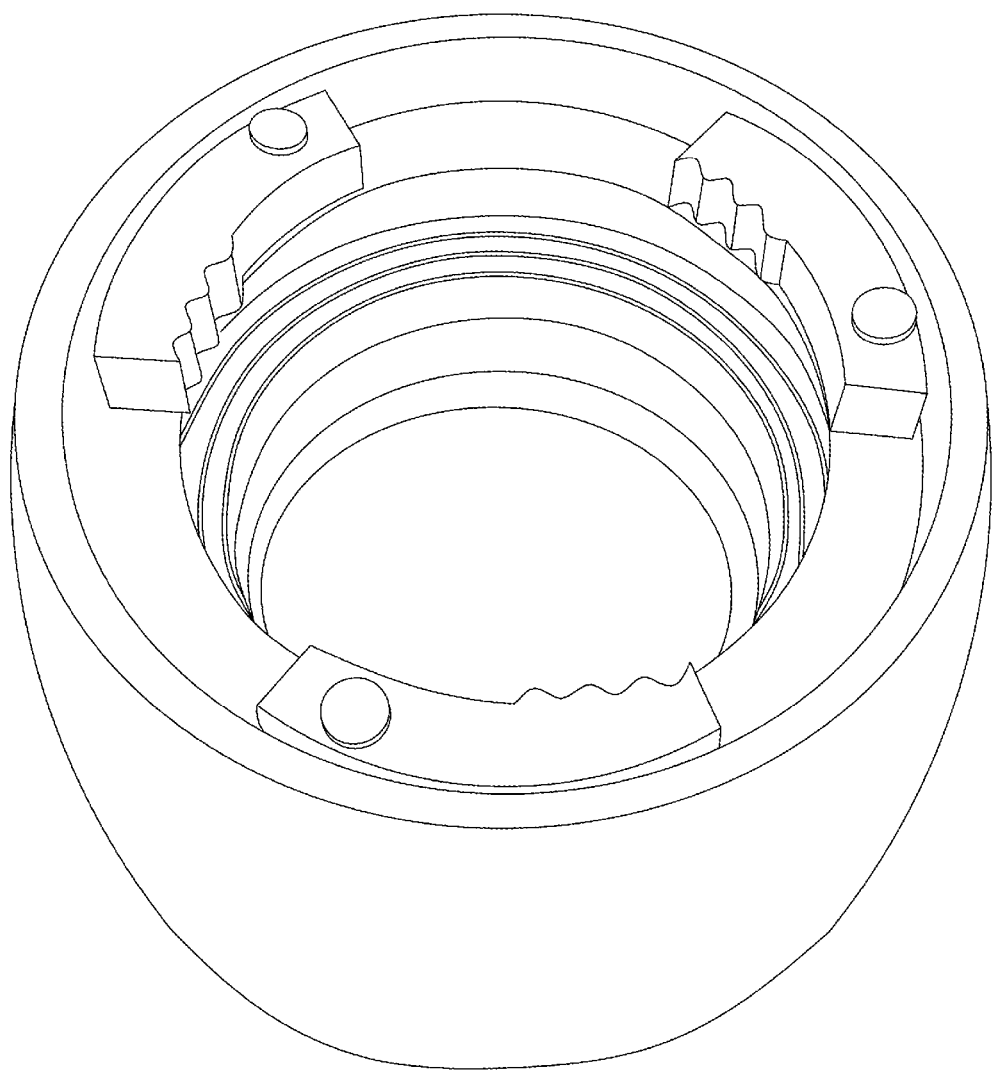
Figure 17:
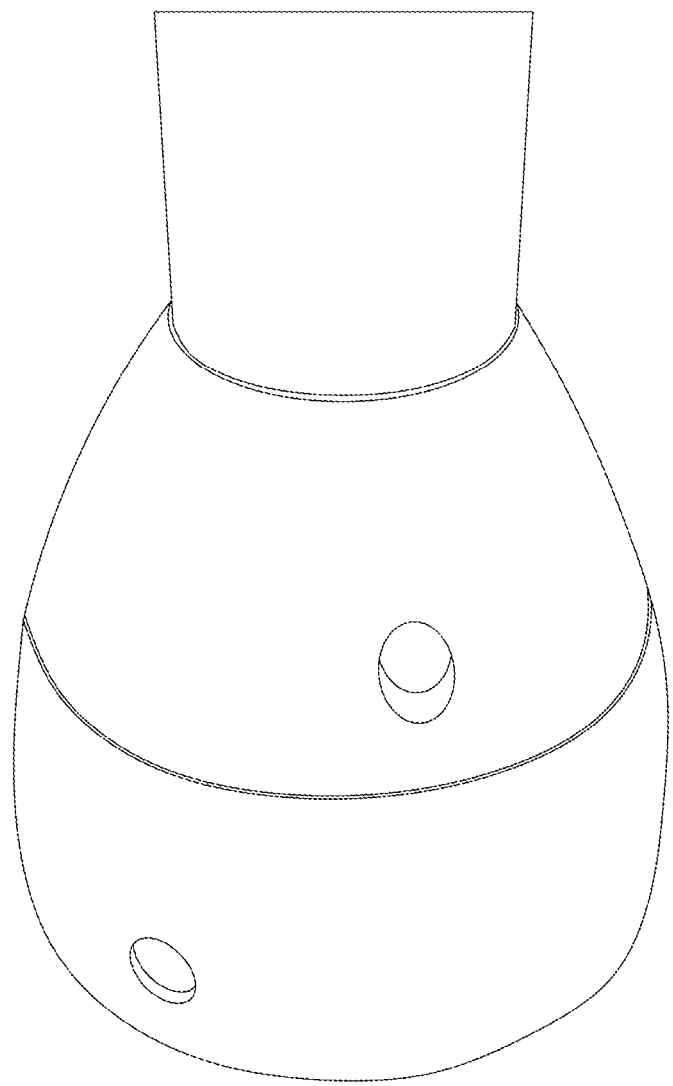
FIG. 17 shows an assembled end assembly of examples.
Figure 18:
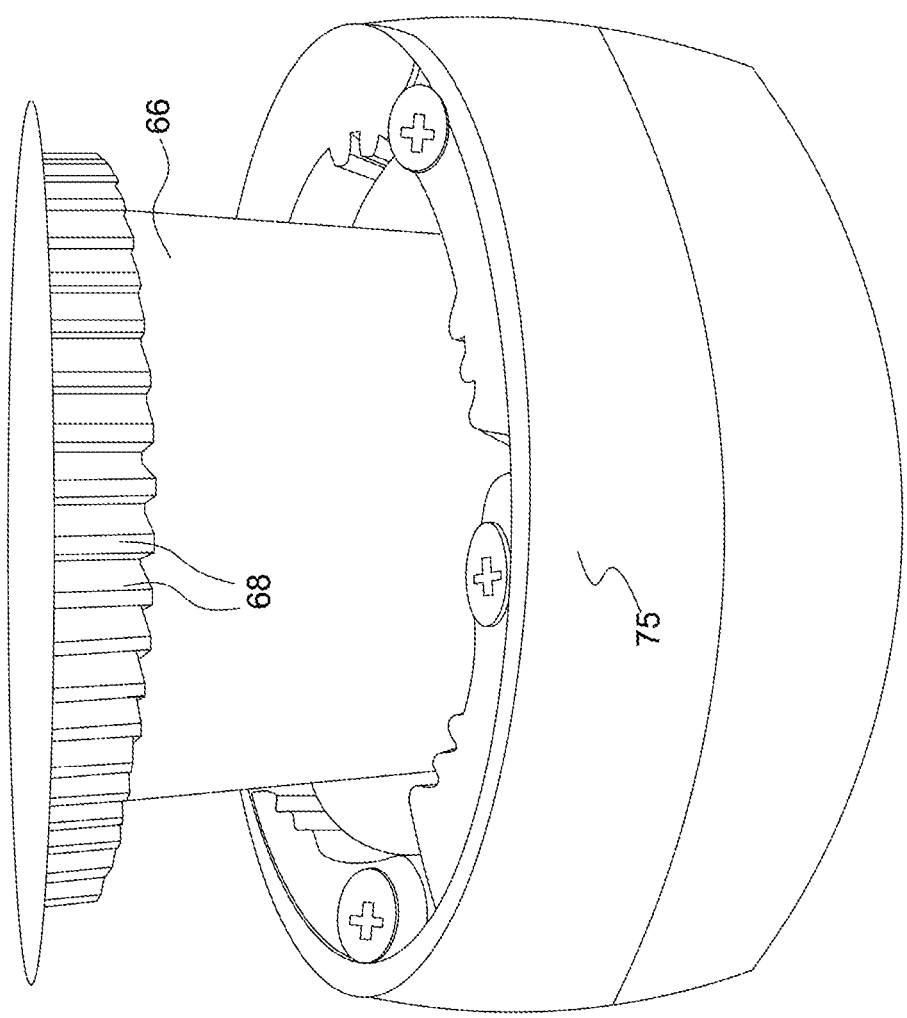
FIGS. 18 to 26 show various views and parts of an end assembly of different examples.
Figure 19:
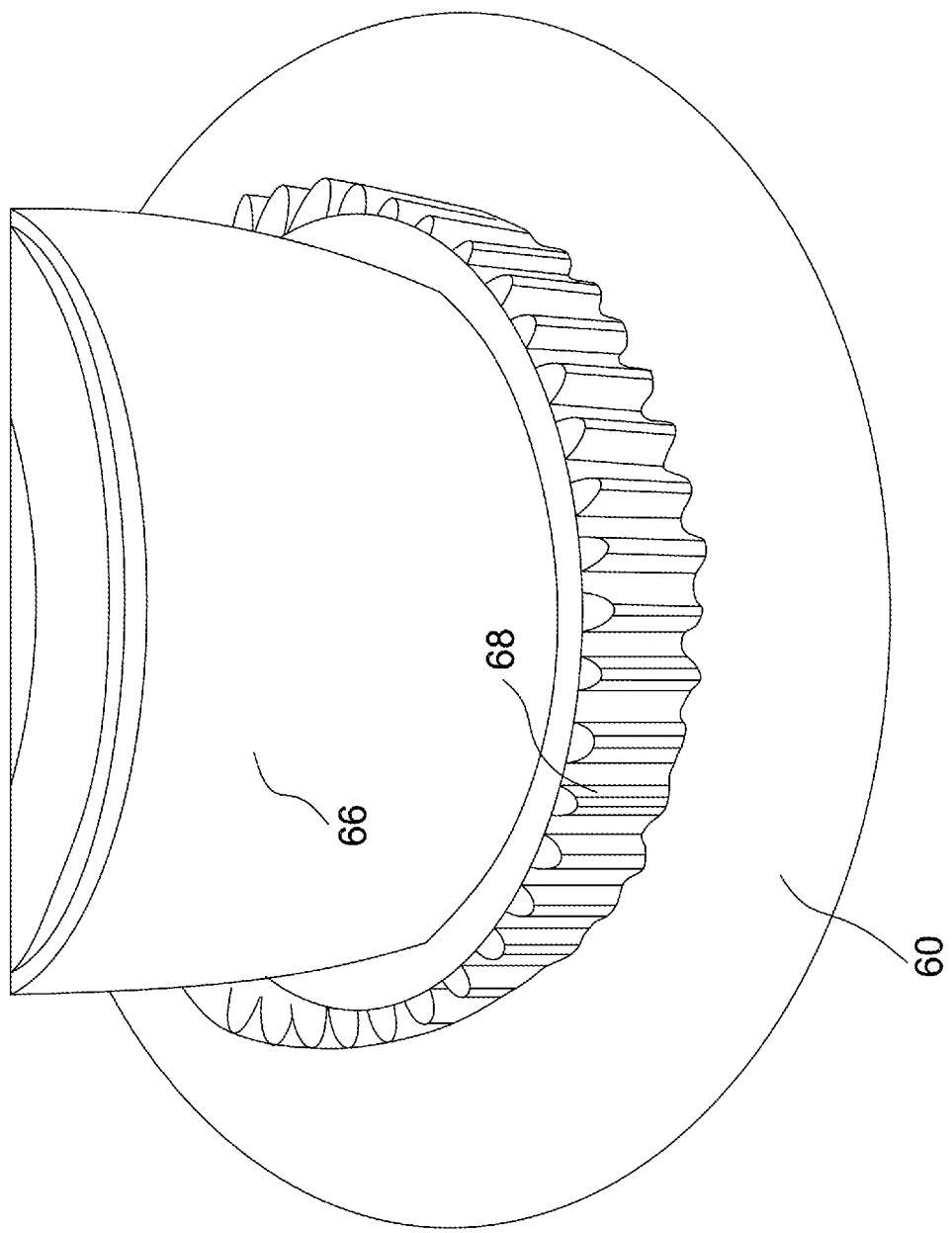
Figure 20:
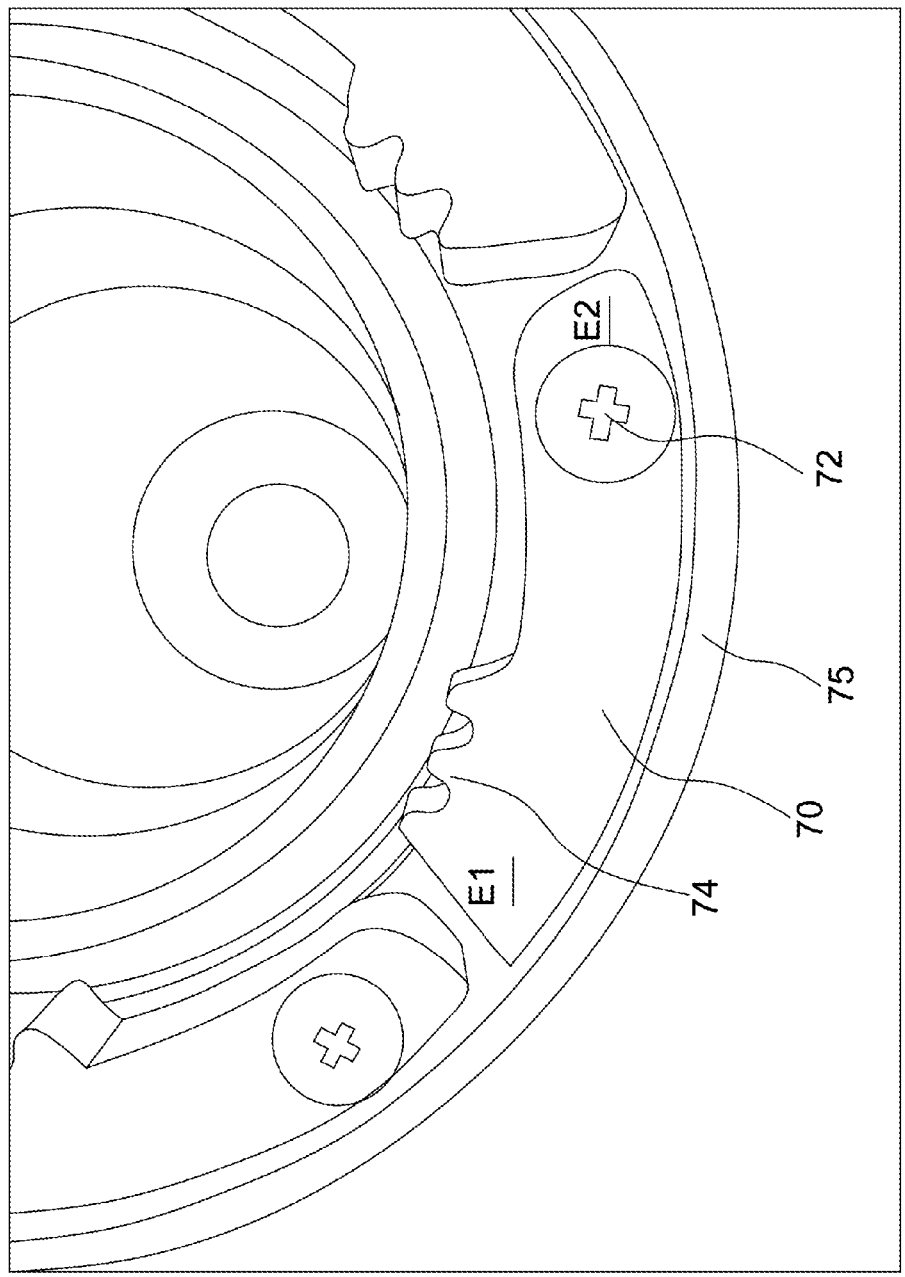
Figure 21:
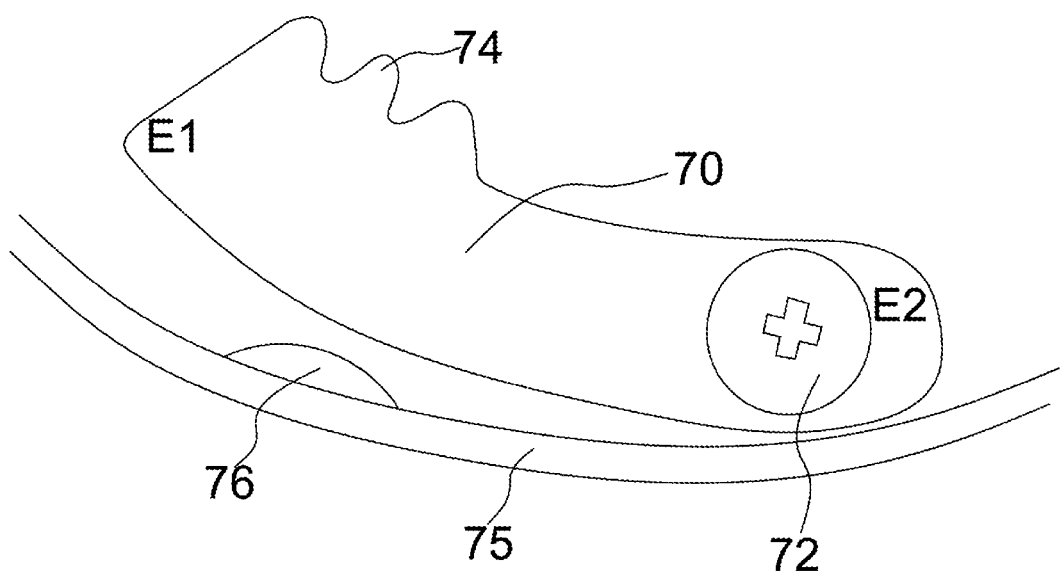

FIGS. 16a and 16b show respectively the first body and the second body, and FIG. 17 shows the first and second bodies assembled relative to each other as the end assembly.

Figure 22:
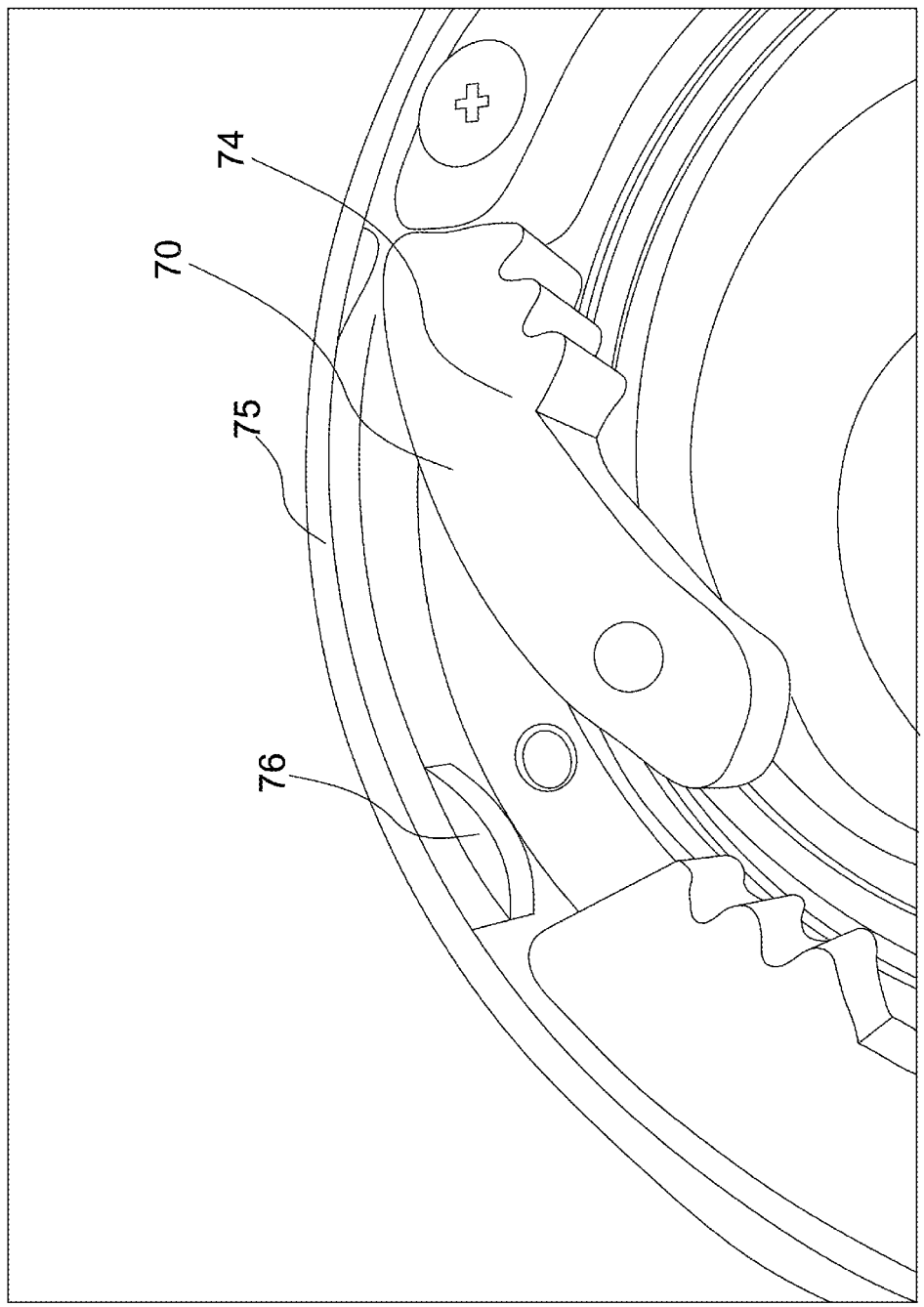
Figure 23:
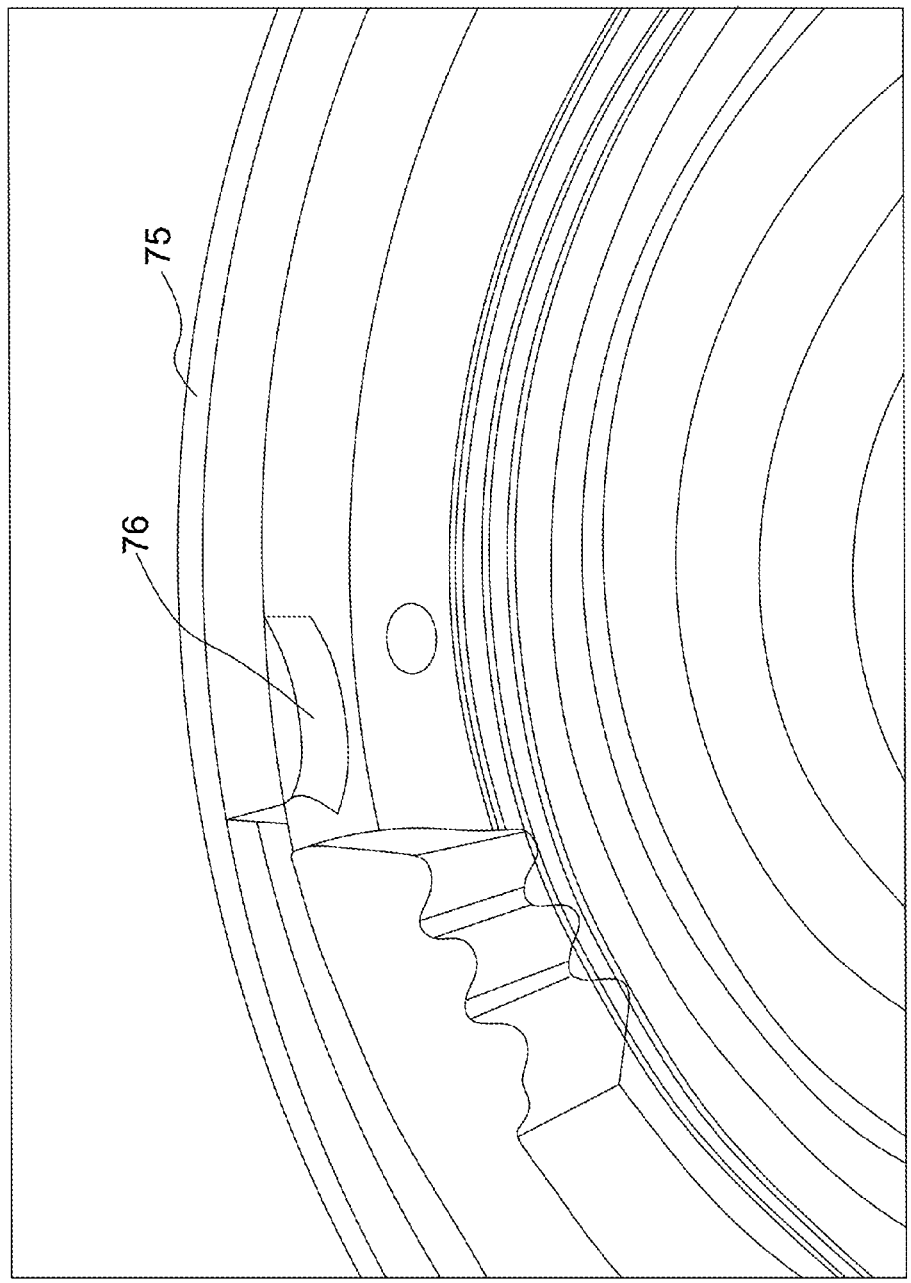

FIGS. 18 to 26 show various views and parts of an end assembly similar to that described with FIGS. 14 to 17. Features of these examples are similar to those described above, and are labelled with the same reference numerals; corresponding descriptions should be taken to apply here too. Therefore, differences between the examples will now be described. It is to be noted that FIGS. 22 and 23 show the pivot removed, and the second engagement element moved or removed, for illustration purposes, to more clearly show the cam 76. As can be seen, for example in FIG. 20, there are more second engagement elements and corresponding cams distributed circumferentially. For example there are six second engagement elements and corresponding cams.

Figure 24:
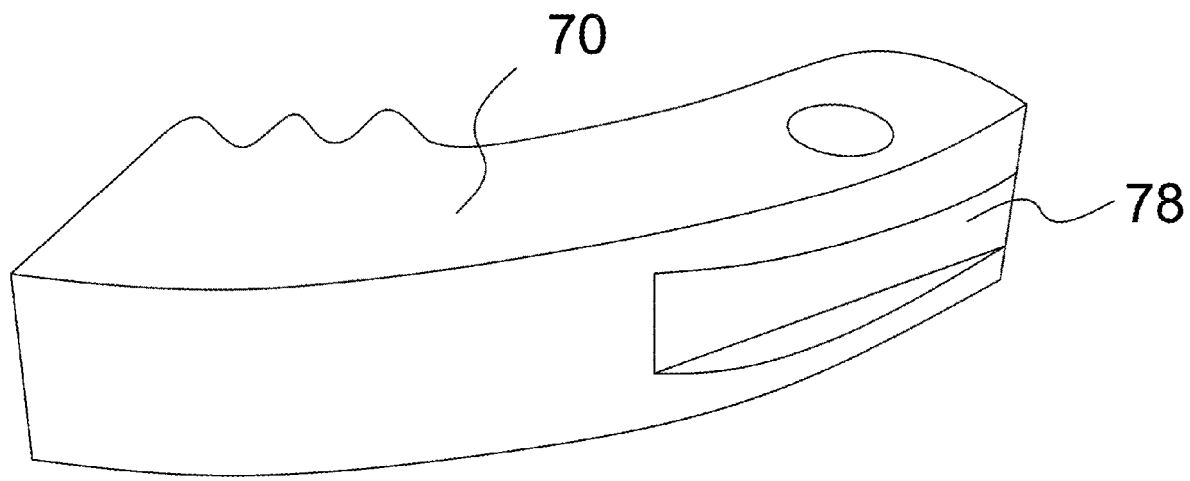
Figure 25:
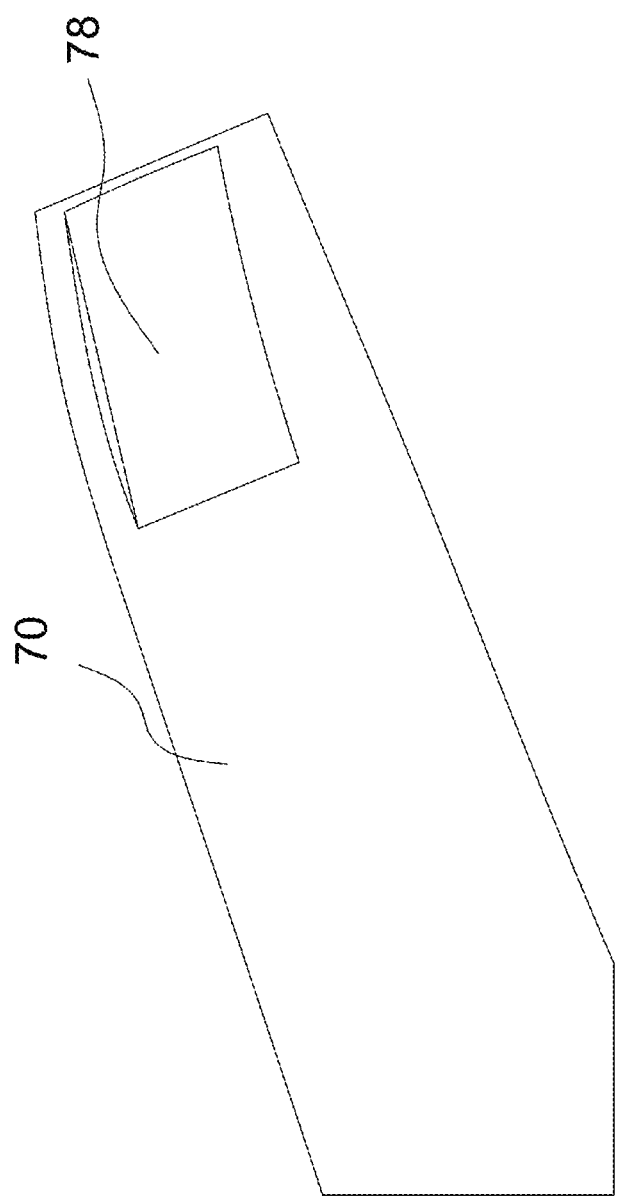
Figure 26:
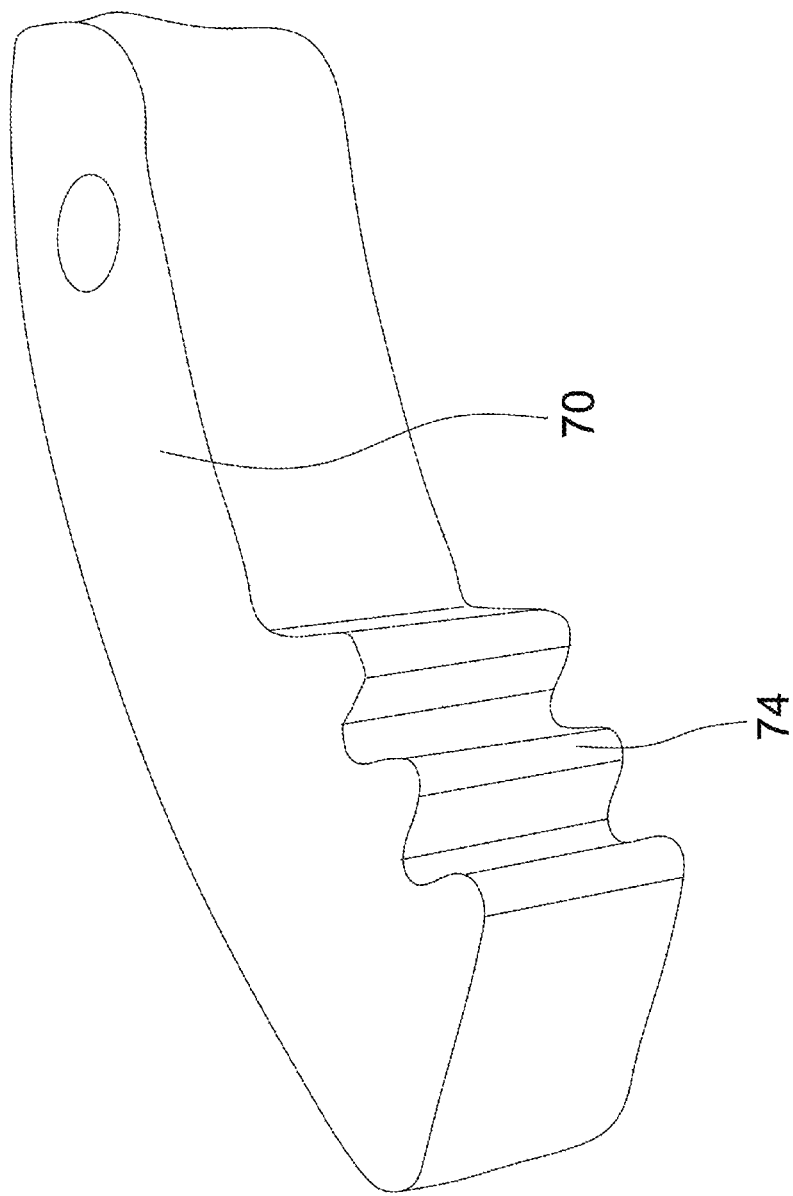

As shown in FIG. 24 a cam contact surface 78 of the second engagement element is for example a flat or planar surface, which may be recessed as a channel or groove within a side of the second engagement element, and is located for contacting a surface of a cam of the movable element. Such recessing can help to make the radial dimensions of the assembly more compact. In conjunction with the shape of the cam profile, for example a rounded or semi-circular profile, and the radial location and extent of the cam contact surface (for example at the second end E2 rather than the first end E1), the cam surface when sliding along the cam contact surface of the second engagement element can, when rotating the movable element in one direction, cause the second engagement element to pivot to the first pivoted position, and when rotating the movable element in the opposite direction, cause the second engagement element to pivot to the second pivoted position. Such a design may reduce an extent of rotation of the movable element required between the first and second positions of the movable element. However, such a design may require more input force by a user to switch the movable element between the first and second positions, which may help to decrease the chances that the movable element may be accidentally moved by a user during a dance sequence.

The above examples are to be understood as illustrative examples. Further examples are envisaged. For example, a profile of a cam described earlier may be different in other examples, but still providing an equivalent function to for example guide one engagement element into engagement with another.

In some examples, the movable element may be connected or even integrated with one of the engagement elements. Hence, although a rotatable movable element is focused on above, in other examples a translatable movable element, which may be formed as one piece with an engagement element, for example the second engagement element, is envisaged. Such a movable element may be translatable linearly in a direction coincident a longitudinal axis, for example the shaft axis, between the first and second positions. To hold the movable element in the first or second positions, without manual switching, there may be a suitable mechanism in place. For example, the shaft may have a rounded protrusion, or depressable but outwardly biased (e.g. outwardly sprung) element, which the movable element is slid over, upwards, to engage the engagement elements, and which is slid back over, downwards, to disengage the engagement elements. Further examples are envisaged which utilise a rotatable or translatable movable element, as the skilled person will appreciate.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An end assembly for a dance exercise pole, the end assembly comprising:
   an end part;
   a connector configured for connection to a part of a dance pole;
   a first engagement element connected to the connector;
   a second engagement element engageable with the first engagement element; and
   a movable element movable between a first position and a second position to move at least one of the first engagement element or the second engagement element and thereby switch the end part respectively between:
      a first configuration with the first engagement element disengaged from the second engagement element, and with the connector capable of rotation relative to the end part; and
      a second configuration with the first engagement element engaged with the second engagement element to restrict the rotation of the connector relative to the end part.

2. The end assembly of claim 1, the movable element comprising a first cam with a first cam surface in contact with the second engagement element.

3. The end assembly of claim 2, wherein at least one of:
   the second engagement element comprises a first cam contact surface, the first cam contact surface slidable along the first cam surface during movement of the movable element between the first position and the second position;
   the second engagement element comprises a first cam contact surface, the first cam contact surface slidable along the first cam surface during movement of the movable element between the first position and the second position, the first cam comprising a first step and a second step, and the first cam contact surface comprising a third step and a fourth step, the first step engaged with the third step with the end assembly in the first configuration, and the second step engaged with the fourth step with the end assembly in the second configuration;
   the first cam has a first tapered cam profile; or
   the movable element comprises a second cam having a second tapered cam profile, the second engagement element comprising a second cam contact surface in contact with the second cam, the second cam contact surface slidable along the second cam surface during movement of the movable element between the first position and the second position.

4. The end assembly of claim 3, one of the first cam contact surface or the first cam surface comprising an indent and the other one of the first cam contact surface or the first cam surface comprising a bump receivable by the indent, wherein with the assembly in the second configuration the bump is received within the indent.

5. The end assembly of claim 4, wherein the bump has a first rounded profile and the indent has a second rounded profile corresponding to the first rounded profile.

6. The end assembly of claim 1, wherein the movable element is annular and comprises a plurality of cams distributed circumferentially, the movable element rotatable between the first position and the second position.

7. The end assembly of claim 6, wherein at least one of:
   each cam of the plurality of cams comprises respectively a tapered cam profile which tapers in one of a clockwise or an anti-clockwise direction; or
   a cam of the plurality of cams is separated from a first adjacent cam of the plurality of cams by a first step and from a second adjacent cam by a second step, the first step larger than the second step.

8. The end assembly of claim 6, the second engagement element comprising a plurality of cam contact surfaces, each cam contact surface of the plurality of cam contact surfaces engaged with a respective cam of the plurality of cams.

9. The end assembly of claim 8, wherein at least one of:
   the second engagement element comprises a plurality of cam contact parts each comprising respectively a cam contact surface of the plurality of cam contact surfaces, wherein each cam contact part tapers in an opposite one of a clockwise direction or an anti-clockwise direction to which each cam of the plurality of cams tapers;
   a cam contact surface of the plurality of cam contact surfaces separated from a first adjacent cam contact surface of the plurality of cam contact surfaces by a third step and from a second adjacent cam contact surface of the plurality of cam contact surfaces by a fourth step; or
   the second engagement element comprises a plurality of cam contact parts each comprising respectively a cam contact surface of the plurality of cam contact surfaces, wherein each cam contact part tapers in an opposite one of a clockwise direction or an anti-clockwise direction to which each cam of the plurality of cams tapers, wherein the second engagement element is annular and the plurality of cam contact parts are distributed circumferentially.

10. The end assembly of claim 1, wherein the first engagement element comprises a first plurality of protrusions and the second engagement element comprises a second plurality of protrusions engageable with the first plurality of protrusions.

11. The end assembly of claim 10, wherein at least one of:
with movement of the movable element from the first position to the second position, the second engagement element is moved towards the first engagement element to engage the first plurality of protrusions with the second plurality of protrusions, and with movement of the movable element from the second position to the first position, the second engagement element is moved away from the first engagement element to disengage the first plurality of protrusions from the second plurality of protrusions;
a first protrusion of one of the first plurality of protrusions or the second plurality of protrusions comprises an angled surface to guide a second protrusion of the respective other of the first plurality of protrusions or the second plurality of protrusions towards engagement with an inter-protrusion surface during switching of the end assembly from the first configuration to the second configuration; or
a first protrusion of one of the first plurality of protrusions or the second plurality of protrusions comprises an angled surface to guide a second protrusion of the respective other of the first plurality of protrusions or the second plurality of protrusions towards engagement with an inter-protrusion surface during switching of the end assembly from the first configuration to the second configuration, the end assembly comprising a biasing element configured to bias the second engagement element to disengage from the first engagement element upon movement of the movable element from the second position to the first position.

12. The end assembly of claim 10, comprising a third engagement element engageable with the second engagement element.

13. The end assembly of claim 12, wherein at least one of:
i) the third engagement element is fixed against rotational movement relative to the end part;
ii) the third engagement element comprises a third plurality of protrusions engageable with the second plurality of protrusions, wherein in the first configuration the third plurality of protrusions are disengaged from the second plurality of protrusions and in the second configuration the third plurality of protrusions are engaged with the second plurality of protrusions;
iii) with movement of the movable element from the first position to the second position, the second engagement element is moved towards the first engagement element to engage the first plurality of protrusions with the second plurality of protrusions, and with movement of the movable element from the second position to the first position, the second engagement element is moved away from the first engagement element to disengage the first plurality of protrusions from the second plurality of protrusions, wherein the third engagement element comprises a third plurality of protrusions engageable with the second plurality of protrusions, wherein in the first configuration the third plurality of protrusions are disengaged from the second plurality of protrusions and in the second configuration the third plurality of protrusions are engaged with the second plurality of protrusions, wherein:
with the movement of the movable element from the first position to the second position, the second engagement element is moved towards the third engagement element to engage the third plurality of protrusions with the second plurality of protrusions; and
with the movement of the movable element from the second position to the first position, the second engagement element is moved away from the third engagement element to disengage the third plurality of protrusions from the second plurality of protrusions; or
iv) the third engagement element comprises a third plurality of protrusions engageable with the second plurality of protrusions, wherein in the first configuration the third plurality of protrusions are disengaged from the second plurality of protrusions and in the second configuration the third plurality of protrusions are engaged with the second plurality of protrusions, wherein a sum of a first radial width of the first plurality of protrusions and a third radial width of the third plurality of protrusions is at least equal to a second radial width of the second plurality of protrusions.

14. The end assembly of claim 1, comprising a shaft connected to the end part, the shaft having a shaft axis, the first engagement element and the connector mounted on the shaft, wherein:
the first engagement element and the connector are rotatable about the shaft axis with the end assembly in the first configuration; and
the first engagement element and the connector are non-rotatable about the shaft axis with the end assembly in the second configuration.

15. The end assembly of claim 14, wherein at least one of:
the first position of the movable element is a first rotational position relative to the shaft and the second position of the movable element is a second rotational position relative to the shaft, the movable element rotatable about the shaft axis to move the movable element between the first position and the second position;
the first engagement element is mounted on the shaft at a first shaft axis position on the shaft axis, and the second engagement element is movable by the movable element between a second shaft axis position on the shaft axis and a third shaft axis position on the shaft axis, the second engagement element in the second shaft axis position with the end assembly in the first configuration and the second engagement element in the third shaft axis position with the end assembly in the second configuration;
the first engagement element is mounted on the shaft at a first shaft axis position on the shaft axis, and the second engagement element is movable by the movable element between a second shaft axis position on the shaft axis and a third shaft axis position on the shaft axis, the second engagement element in the second shaft axis position with the end assembly in the first configuration and the second engagement element in the third shaft axis position with the end assembly in the second configuration, wherein the first engagement element comprises a first plurality of protrusions and the second engagement element comprises a second plurality of protrusions engageable with the first plurality of protrusions comprising a third engagement element engageable with the second engagement element, the shaft comprising a channel parallel the shaft axis, the third engagement element comprising a first inward protrusion inserted in the channel to restrict rotational movement of the first engagement element about the shaft axis;
the first engagement element is mounted on the shaft at a first shaft axis position on the shaft axis, and the second engagement element is movable by the movable element between a second shaft axis position on the shaft axis and a third shaft axis position on the shaft axis, the second engagement element in the second shaft axis position with the end assembly in the first configuration and the second engagement element in the third shaft axis position with the end assembly in the second configuration, wherein the first engagement element comprises a first plurality of protrusions and the second engagement element comprises a second plurality of protrusions engageable with the first plurality of protrusions comprising a third engagement element engageable with the second engagement element, the shaft comprising a channel parallel the shaft axis, the third engagement element comprising a first inward protrusion inserted in the channel to restrict rotational movement of the first engagement element about the shaft axis, the second engagement element comprising a second inward protrusion inserted in the channel, the second inward protrusion movable along the channel during movement of the second engagement element between the second shaft axis position and the third shaft axis position; or the shaft comprising a bearing surface and the end assembly comprising a bearing system in contact with the bearing surface, the connector capable of the rotation relative to the end part using the bearing system with the end assembly in the first configuration.

16. The end assembly of claim 1, comprising a tubular body, the tubular body at one end comprising the first engagement element and at another end the tubular body configured for connection to the part of the dance pole.

17. The end assembly of claim 16, comprising a shaft connected to the end part, the shaft having a shaft axis, the first engagement element and the connector mounted on the shaft, wherein at least one of:

the first engagement element and the connector are rotatable about the shaft axis with the end assembly in the first configuration;

the first engagement element and the connector are non-rotatable about the shaft axis with the end assembly in the second configuration the shaft comprising a bearing surface and the end assembly comprising a bearing system in contact with the bearing surface, the connector capable of the rotation relative to the end part using the bearing system with the end assembly in the first configuration; or the tubular body comprising the bearing system, part of the shaft inserted within the tubular body and in contact with the bearing system.

18. The end assembly of claim 1, wherein the second engagement element is pivotable between:

a first pivoted position with the assembly in the first configuration; and a second pivoted position with the assembly in the second configuration.

19. The end assembly of claim 18, wherein at least one of:

the second engagement element comprises a first cam contact surface, the first cam contact surface slidable along the first cam surface during movement of the movable element between the first position and the second position, wherein the first cam has a first tapered cam profile, the first cam contact surface slidable along part of the first cam surface with the first tapered cam profile, to pivot the second engagement element from the first pivoted position to the second pivoted position;

a minimum distance between the second engagement element and the movable element is less than a maximum width of the first tapered cam profile;

the end assembly comprises a first body connected to the end part, wherein the second engagement element is attached to the first body by a pivot;

the end assembly comprises a first body connected to the end part, wherein the second engagement element is attached to the first body by a pivot, the first engagement element comprising a plurality of first protrusions and the second engagement element comprising at least one second protrusion engageable with at least one of the plurality of first protrusions, the second engagement element having a first end and a second end, the at least one second protrusion located closer to the first end than the second end, and the pivot located closer to the second end than the first end;

the end assembly comprises a first body connected to the end part, wherein the second engagement element is attached to the first body by a pivot, the first engagement element comprising a plurality of first protrusions and the second engagement element comprising at least one second protrusion engageable with at least one of the plurality of first protrusions, the second engagement element having a first end and a second end, the at least one second protrusion located closer to the first end than the second end, and the pivot located closer to the second end than the first end, wherein the first engagement element is annular, and the movable element is annular and concentric with the first engagement element, the second engagement element located between the first engagement element and the movable element, wherein with the second engagement element in the second pivoted position the at least one second protrusion is radially displaced inwards compared with in the first pivoted position;

the second engagement element being one second engagement element, the end assembly comprising another one of the second engagement element circumferentially adjacent the one second engagement element, wherein the movable element is annular and the first cam has a second tapered cam profile which tapers in an opposite direction to the first tapered cam profile, the first cam contact surface of the another one of the second engagement element slidable along part of the first cam surface with the second tapered cam profile, to pivot the another of the second engagement element from the second pivoted position to the first pivoted position;

the movable element is annular and comprises a plurality of the first cam distributed circumferentially, the end assembly comprising a plurality of the second engagement element distributed circumferentially and in correspondence respectively with the plurality of the first cam; or the end assembly comprises a first body connected to the end part, wherein the second engagement element is attached to the first body by a pivot, the end assembly comprising a second body comprising the connector and the first engagement element, the first body comprising a bearing system and the second body comprising a bearing surface in contact with the bearing system, the connector capable of rotation relative to the end assembly using the bearing system with the assembly in the first configuration.

20. The end assembly of claim 1, comprising a handle connected to the movable element and movable to move the movable element between the first position and the second position.

21. The end assembly of claim 1, comprising a mechanism to hold the movable element in at least one of the first position or the second position.

22. The end assembly of claim 1, comprising at least one of:
- a rounded protrusion;
- a depressable outwardly biased element; or
- a depressable outwardly sprung element, for holding the movable element in at least one of the first position or the second position.

23. The end assembly of claim 1, wherein at least one of:
- i) the end assembly; or
- ii) the movable element, is enclosable within a cylindrical volume with a diameter of at least one of:
- equal to or less than 50 millimetres;
- equal to or less than 45 millimetres; or
- equal to or less than 40 millimetres.

24. The end assembly of claim 1, wherein the movable element is translatable linearly between the first position and the second position, in a direction coincident with a longitudinal axis of the end assembly.

\* \* \* \* \*